United States Patent
Xu et al.

(10) Patent No.: US 12,439,167 B1
(45) Date of Patent: Oct. 7, 2025

(54) IR ILLUMINATION CONTROL FOR CAMERAS WITH MULTI-REGION ARRAY

(71) Applicant: Ambarella International LP, Santa Clara, CA (US)

(72) Inventors: Ruian Xu, San Jose, CA (US); Peichun Peng, Santa Clara, CA (US)

(73) Assignee: Ambarella International LP, Santa Clara, CA (US)

( * ) Notice: Subject to any disclaimer, the term of this patent is extended or adjusted under 35 U.S.C. 154(b) by 322 days.

(21) Appl. No.: 18/087,916

(22) Filed: Dec. 23, 2022

(51) Int. Cl.
*H04N 23/74* (2023.01)
*H04N 23/56* (2023.01)
*H04N 23/61* (2023.01)
*H04N 23/71* (2023.01)
*H04N 25/20* (2023.01)

(52) U.S. Cl.
CPC ............ *H04N 23/74* (2023.01); *H04N 23/56* (2023.01); *H04N 23/61* (2023.01); *H04N 23/71* (2023.01); *H04N 25/20* (2023.01)

(58) Field of Classification Search
None
See application file for complete search history.

(56) References Cited

U.S. PATENT DOCUMENTS

| | | | | |
|---|---|---|---|---|
| 5,706,383 | A * | 1/1998 | Malcuit | G02F 1/3523 257/432 |
| 11,108,957 | B1 * | 8/2021 | Oh | G01S 17/894 |
| 11,146,747 | B1 * | 10/2021 | Zhang | G06V 10/82 |
| 2003/0185499 | A1 * | 10/2003 | Butler | G02B 6/425 385/24 |
| 2018/0089917 | A1 * | 3/2018 | Obaidi | G06Q 10/083 |
| 2019/0246025 | A1 * | 8/2019 | Duran | H04N 23/20 |
| 2020/0302147 | A1 * | 9/2020 | Gabriele | G02B 5/3058 |
| 2021/0058539 | A1 * | 2/2021 | Van Der Sijde | H04N 23/71 |
| 2021/0258457 | A1 * | 8/2021 | Akkaya | G01S 17/894 |
| 2022/0244041 | A1 * | 8/2022 | Shou | G01B 9/02092 |

* cited by examiner

*Primary Examiner* — Kaitlin A Retallick
(74) *Attorney, Agent, or Firm* — Maiorana Patent Law, PA

(57) ABSTRACT

An apparatus comprising an infrared (IR) illuminator, an interface and a processor. The IR illuminator may comprise an array of emitters divided into a plurality of segments each configured to generate an amount of an IR light. The interface may be configured to receive pixel data comprising the IR light. The processor may be configured to process the pixel data arranged as video frames, extract IR illumination data for each of a plurality of zones of the video frames, perform a comparison of the IR illumination data in each zone to an exposure threshold, and generate a control signal in response to the comparison. Each zone may correspond to a subsection of the video frames associated with a respective one of the segments. The control signal may be configured to independently adjust the amount of the IR light generated by each of the segments for each of the zones.

19 Claims, 12 Drawing Sheets

IR ILLUMINATION CONTROL FOR CAMERAS WITH MULTI-REGION ARRAY

FIELD OF THE INVENTION

The invention relates to computer vision generally and, more particularly, to a method and/or apparatus for implementing IR illumination control for cameras with multi-region array.

BACKGROUND

Internet-connected security cameras (i.e., IP security cameras), such as video doorbell cameras typically use an infrared (IR) illuminator. At night, security cameras that use an IR illuminator can switch to black and white video to provide night vision. The IR illuminator can provide illumination for the image sensor of the camera at night, for the black and white, night vision video. Conventionally, IR light emitting diodes (LEDs) are used as the IR illuminator. Illumination provided by IR LEDs have a number of constraints in camera products.

Some camera products are constrained by a form factor. For example, video doorbells are often used as a security camera. Video doorbells are designed with a thin profile that cannot accommodate IR LEDs on the side of the camera (i.e., there is not sufficient physical space for the IR LEDs to be placed all around the image sensor. As a result, doorbell cameras are typically subject to a number of limitations.

One of the limitations is a range limitation. Generally, the thin profile camera products are configured to work at a specific optimal distance (i.e., 10 feet distance, 20 feet distance, etc.). Objects that are closer than the optimal distance suffer from overexposure (i.e., overexposure with close objects) and suffer from underexposure for objects that are farther than the optical distance (i.e., underexposure with far objects). Overexposure can also occur when installed next to a wall. Another of the limitations is lack of programmability. The lack of programmability for control of the IR illumination can result in excess power consumption. Excess power consumption is of particular concern in battery powered cameras.

It would be desirable to implement IR illumination control for cameras with multi-region array.

SUMMARY

The invention concerns an apparatus comprising an infrared (IR) illuminator, an interface and a processor. The IR illuminator may comprise an array of emitters divided into a plurality of segments each configured to generate an amount of an IR light. The interface may be configured to receive pixel data comprising the IR light. The processor may be configured to process the pixel data arranged as video frames, extract IR illumination data for each of a plurality of zones of the video frames, perform a comparison of the IR illumination data in each of the zones to an exposure threshold, and generate a control signal in response to the comparison. Each of the zones may correspond to a subsection of the video frames that is associated with a respective one of the segments. The control signal may be configured to independently adjust the amount of the IR light generated by each of the segments of the array of emitters for each of the plurality of zones. The amount of the IR light may be adjusted from a current amount in each of the zones in response to the comparison determining that the IR illumination data is outside of the exposure threshold.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
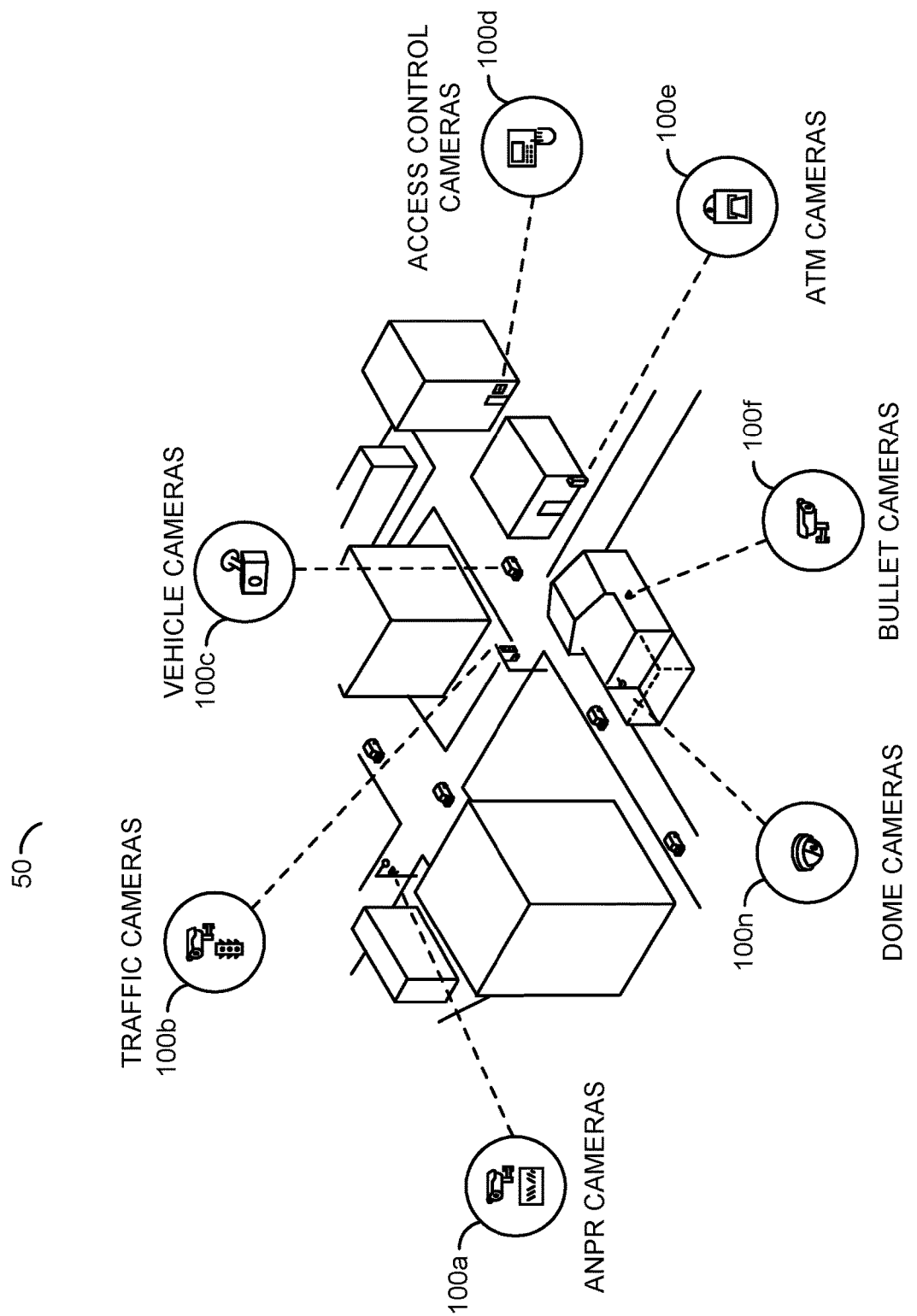
FIG. 1 is a diagram illustrating examples of edge devices that may utilize a processor configured to implement IR illumination control for cameras with a multi-region VCSEL array in accordance with example embodiments of the invention.

Embodiments of the present invention include providing IR illumination control for cameras with multi-region array that may (i) dynamically control an amount of IR illumination in addressable zones, (ii) provide independently addressable segments, (iii) adapt a strength of IR illumination depending on objects in real-time, (iv) provide IR illumination that may be implemented in a thin profile device, (v) measure IR illumination strength based on IR reflection, (vi) perform computer vision operations to detect a distance to various objects, (vii) adjust the IR illumination strength based on a distance to a stationary object, (viii) dynamically adjust IR illumination strength based on tracking changes in distance and/or position of a moving object over time, (ix) avoid overexposure and underexposure, (x) conserve power during a static scene, (xi) implement a multi-region VCSEL array and/or (xii) be implemented as one or more integrated circuits.

Embodiments of the present invention may be configured to control an amount of infrared (IR) illumination for camera systems. The amount of IR illumination may be dynamically adjusted to adapt to changes that occur in captured video frames. Dynamically adjusting the amount of IR illumination may avoid IR overexposure, IR underexposure and/or intelligently conserve power consumption.

Embodiments of the present invention may be configured to implement a multi-zone (or multi-region) IR illumination array. The multi-zone IR illumination array may be configured to be implemented in camera systems that have a thin profile (e.g., video doorbells). In one example, the multi-segment IR illumination array may be implemented as a Vertical Cavity Surface Emitting Laser (VCSEL) array. The VCSEL array may provide multiple segments that may each independently provide an amount of IR light to a zone in a video frame. Each of the independent segments may be independently addressable to enable adjustments to the amount of IR illumination provided in each of the zones. By independently controlling the amount of IR illumination in each zone in real-time, an amount of IR illumination may be selected to be suitable for particular environmental circumstances.

Embodiments of the present invention may be configured to implement a video processor configured to implement computer vision operations. The computer vision operations may enable the video processor to determine a size, distance and/or type of objects captured in the video frames. Using the results of the computer vision operations, the video processor may determine an appropriate amount of IR illumination. The video processor may be configured to generate control signals that may individually address the multiple segments of the IR illumination array. The video processor may select the amount of IR illumination generated by each of the segments of the VCSEL array. By independently controlling the amount of IR illumination generated by each of the segments of the VCSEL array, the video processor may prevent IR exposure (e.g., prevent overexposure and underexposure) from crossing an exposure threshold and/or adjust the strength of IR illumination in particular zones of interest of the video frames.

In some embodiments of the present invention, a camera system may be implemented with the VCSEL array. The camera system may be configured to measure a level of IR reflection while capturing the video frames. The level of IR reflection may be used to determine an appropriate strength of IR illumination to generate in each of the zones. In one example, output from IR pixels of an RGB-IR image sensor implemented by the camera system may be measured to determine whether a particular region (or zone) may be overexposed. In another example, computer vision operations may be performed on the video frames generated in order to determine which regions (or zones) may be overexposed. For an example, where overexposure is detected in regions 1, 4 and 7, a processor implemented by the camera system may be configured to reduce a strength of the IR illumination in regions 1, 4 and 7. In another example, in an image from the perspective of a front porch of a home with walls on each side of the image frame (e.g., in regions 1/4/7 and 3/6/9 along the left and right sides of a 3×3 region array in an image), IR illumination may be turned off for regions 1/4/7 and 3/6/9 that correspond to the locations of the walls. Using computer vision operations, the processor may determine the location of walls and reduce the amount of IR illumination based on previously stored characteristics about the walls (e.g., the characteristics may comprise information about high overexposure for particular types of objects).

Computer vision operations may be implemented to detect static objects (e.g., walls) that may result in overexposure and/or underexposure. Computer vision operations may be implemented to detect and/or track moving objects (e.g., people, animals, vehicles, etc.). In an example, the processor of the camera system may implement a neural network-based computer vision model configured to detect a moving object and track the location of the moving object in the video frames over time. Based on the tracked location of the moving object, the processor may adjust the amount of IR strength for the regions that correspond to the location of the moving object, as the object moves from region to region over time. In an example, when a person is detected far away from the camera lens, the person may appear small in a single region (e.g., region 4). As the person approaches the camera, the detection results of the tracked location of the person may detect that the relative size of the person has increased and now occupies multiple regions (e.g., 4 and 7). For example, when the person is far away, region 4 may be activated and region 7 may be turned off for power savings and as the person approaches the camera, region 7 may eventually be powered on. The power of the VCSEL may be controlled based on how close the person is in order to gradually decrease for optimal illumination to avoid overexposure. For example, as an object moves closer to the camera lens, overexposure may occur due to an increased amount of IR reflection off the nearby object.

In some embodiments, the VCSEL may be implemented as the multi-zone IR illumination array. Generally, the VCSEL may be suitable for thin profile devices (e.g., the VCSEL may occupy a relatively small amount of physical space). Embodiments of the present invention may be implemented for any type of camera system, regardless of physical space constraints. In one example, IR-LEDs may be implemented as the multi-zone IR illumination array. For example, the IR-LEDs may be designed to be grouped together as independently controllable and/or addressable groups (or segments). The type of multi-zone illumination array implemented may be varied according to the design criteria of a particular implementation.

Referring to FIG. 1, a diagram illustrating examples of edge devices that may utilize a processor configured to implement IR illumination control for cameras with a multi-region VCSEL array in accordance with example embodiments of the invention is shown. An overhead view of an area 50 is shown. In the example shown, the area 50 may be an outdoor location. Streets, vehicles and buildings are shown.

Devices 100a-100n are shown at various locations in the area 50. The devices 100a-100n may each implement an edge device. The edge devices 100a-100n may comprise smart IP cameras (e.g., camera systems). The edge devices 100a-100n may comprise low power technology designed to be deployed in embedded platforms at the edge of a network (e.g., microprocessors running on sensors, cameras, or other battery-powered devices), where power consumption is a critical concern. In an example, the edge devices 100a-100n may comprise various traffic cameras and intelligent transportation systems (ITS) solutions.

The edge devices 100a-100n may be implemented for various applications. In the example shown, the edge devices 100a-100n may comprise automated number plate recognition (ANPR) cameras 100a, traffic cameras 100b, vehicle cameras 100c, access control cameras 100d, automatic teller machine (ATM) cameras 100e, bullet cameras 100f, dome cameras 100n, etc. In an example, the edge devices 100a-100n may be implemented as traffic cameras and intelligent transportation systems (ITS) solutions designed to enhance roadway security with a combination of person and vehicle detection, vehicle make/model recognition, and automatic number plate recognition (ANPR) capabilities.

In the example shown, the area 50 may be an outdoor location. In some embodiments, the edge devices 100a-100n may be implemented at various indoor locations. In an example, edge devices 100a-100n may incorporate a convolutional neural network in order to be utilized in security (surveillance) applications and/or access control applications. In an example, the edge devices 100a-100n implemented as security camera and access control applications may comprise battery-powered cameras, doorbell cameras, outdoor cameras, indoor cameras, etc. The security camera and access control applications may realize performance benefits from application of a convolutional neural network in accordance with embodiments of the invention. In an example, an edge device utilizing a convolutional neural network in accordance with an embodiment of the invention may take massive amounts of image data and make on-device inferences to obtain useful information (e.g., multiple time instances of images per network execution) with reduced bandwidth and/or reduced power consumption. The design, type and/or application performed by the edge devices 100a-100n may be varied according to the design criteria of a particular implementation.

Figure 2:
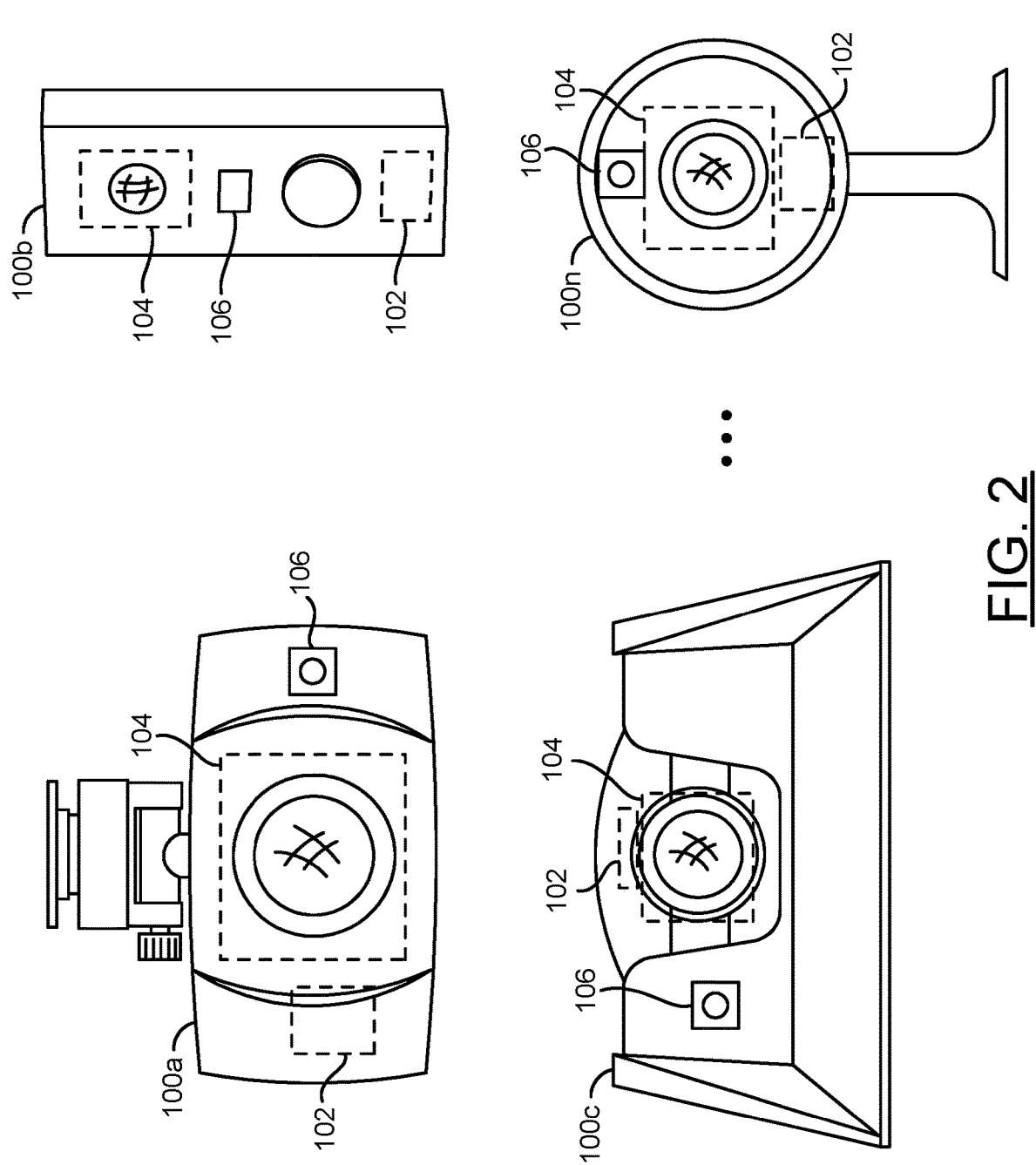
FIG. 2 is a diagram illustrating example cameras implementing an example embodiment of the present invention.

Referring to FIG. 2, a diagram illustrating example cameras implementing an example embodiment of the present invention is shown. The camera systems 100a-100n are shown. Each camera device 100a-100n may have a different style and/or use case. For example, the camera 100a may be an action camera, the camera 100b may be a doorbell security camera, the camera 100n may be a webcam, etc. Other types of cameras may be implemented (e.g., home security cameras, battery powered cameras, ceiling-mounted cameras, stereo cameras, etc.). The design/style of the cameras 100a-100n may be varied according to the design criteria of a particular implementation.

Each of the camera systems 100a-100n may comprise a block (or circuit) 102, a block (or circuit) 104 and/or a block (or circuit) 106. The circuit 102 may implement a processor. The circuit 104 may implement a capture device. The circuit 106 may implement an IR illumination device. The camera systems 100a-100n may comprise other components (not shown). Details of the components of the cameras 100a-100n may be described in association with FIG. 3.

The processor 102 may be configured to implement an artificial neural network (ANN). In an example, the ANN may comprise a convolutional neural network (CNN). The processor 102 may be configured to implement a video encoder. The processor 102 may be configured to process the pixel data arranged as video frames. The capture device 104 may be configured to capture pixel data that may be used by the processor 102 to generate video frames. The IR illumination device 106 may be configured to provide infrared light illumination. The infrared light illumination provided by the IR illumination device 106 may provide illumination in low visible light and/or zero visible light environments. The capture device 104 may capture the pixel data comprising a background image (e.g., the environment) illuminated by the IR light. While each of the cameras 100a-100n are shown implementing the IR illumination device 106, some of the cameras 100a-100n may be implemented without the IR illumination device 106 (e.g., cameras that implement a sensor that does not capture IR light).

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), 3D reconstruction, liveness detection, depth map generation, video encoding and/or video transcoding on-device. For example, even advanced processes such as computer vision and 3D reconstruction may be performed by the processor 102 without uploading video data to a cloud service in order to offload computation-heavy functions (e.g., computer vision, video encoding, video transcoding, etc.).

In some embodiments, multiple camera systems may be implemented (e.g., camera systems 100a-100n may operate independently from each other). For example, each of the cameras 100a-100n may individually analyze the pixel data captured and perform the event/object detection locally. In some embodiments, the cameras 100a-100n may be configured as a network of cameras (e.g., security cameras that send video data to a central source such as network-attached storage and/or a cloud service). The locations and/or configurations of the cameras 100a-100n may be varied according to the design criteria of a particular implementation.

The capture device 104 of each of the camera systems 100a-100n may comprise a single lens (e.g., a monocular camera). In some embodiments, the processor 102 may be configured to accelerate preprocessing of a speckle structured light for monocular 3D reconstruction. Monocular 3D reconstruction may be performed to generate depth images and/or disparity images without the use of stereo cameras. In some embodiments, the capture device 104 may be implemented with stereo lenses. For example, depth images and/or disparity images may be generated using a stereo camera pair. The IR light provided by the IR illumination device 106 may be usable with a monocular camera and/or a stereo camera.

The camera system 100b is shown as a doorbell camera embodiment. The camera system 100b may be implemented with a thin profile. For example, for aesthetic reasons (e.g., placement on a front door of a home), the camera system 100b may be implemented in a housing that may have a tall, thin profile (e.g., approximately 1 inch in thickness or less). The tall, thin profile may result in design constraints for the processor 102, the capture device 104, the IR illumination device 106 and/or other components implemented by the camera system 100b. For example, for the camera system 100a, the IR illumination device 106 may be implemented as a ring of IR light emitting diodes around the lens of the capture device 104.

A video doorbell with the size constraints of the camera system 100b may not have available physical space for the IR illumination device 106 to be implemented as the ring of IR LEDs. In some embodiments, the IR illumination device 106 may be implemented as IR LEDs. In some embodiments, the IR illumination device 106 may be implemented as a VCSEL. The size and/or type of the IR illumination device 106 may be varied according to the design criteria of a particular implementation.

Figure 3:
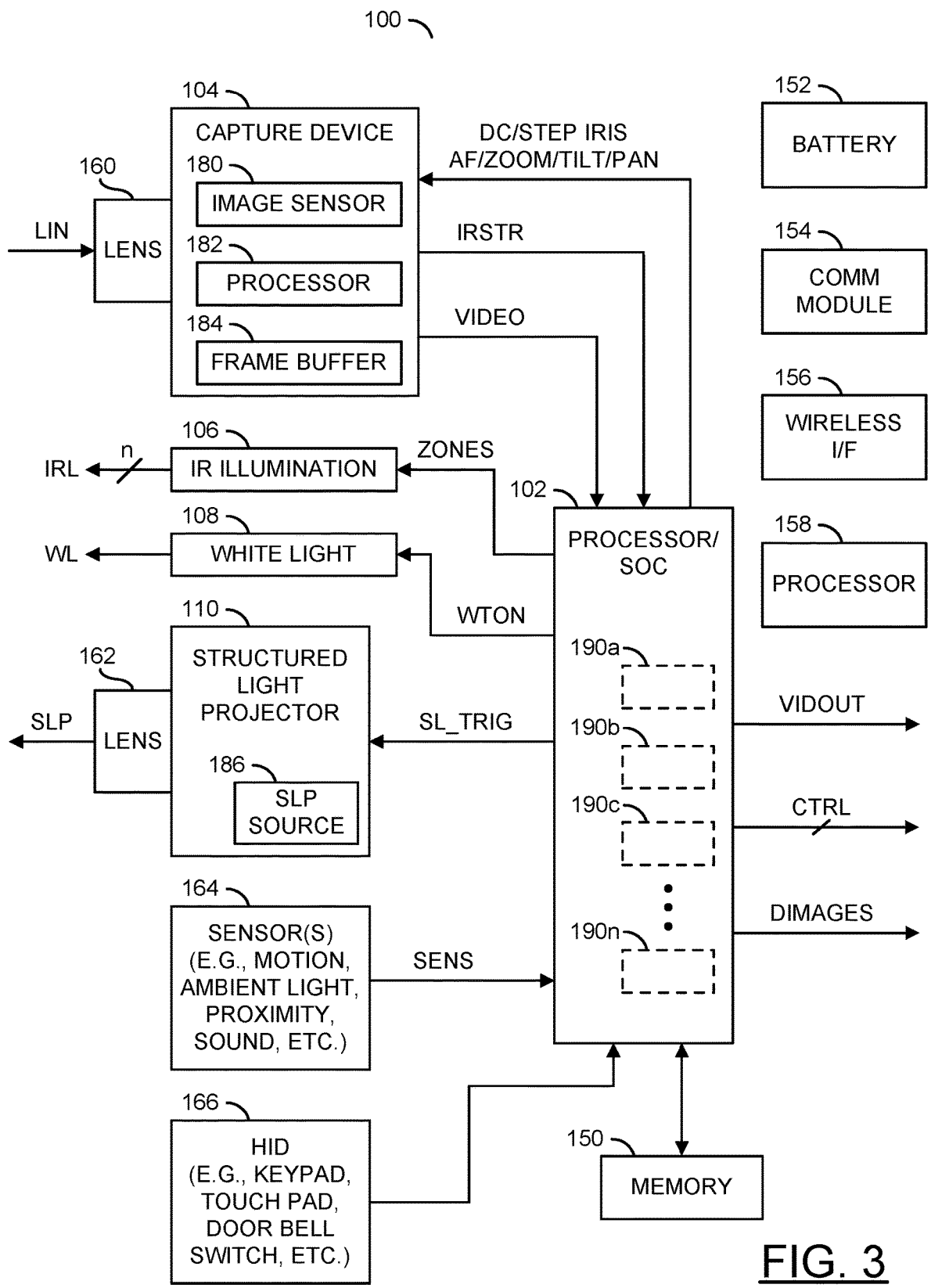
FIG. 3 is a block diagram illustrating a camera system.

Referring to FIG. 3, a block diagram of the camera system 100 is shown illustrating an example implementation. The camera system 100 may be a representative example of the cameras 100a-100n shown in association with FIG. 2. The camera system 100 may comprise the processor/SoC 102, the capture device 104, and the IR illumination device 106.

The camera system 100 may further comprise a block (or circuit) 108, a block (or circuit) 110, a block (or circuit) 150, a block (or circuit) 152, a block (or circuit) 154, a block (or circuit) 156, a block (or circuit) 158, a block (or circuit) 160, a block (or circuit) 162, a block (or circuit) 164, and/or a block (or circuit) 166. The circuit 108 may implement a white light source. The circuit 110 may implement a structured light projector. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The block 162 may implement a structured light pattern lens. The circuit 164 may implement one or more sensors. The circuit 166 may implement a human interface device (HID). In some embodiments, the camera system 100 may comprise the processor/SoC 102, the capture device 104, the IR illumination device 106, the white light source 108, the IR structured light projector 110, the memory 150, the lens 160, the IR structured light projector 110, the structured light pattern lens 162, the sensors 164, the battery 152, the communication module 154, the wireless interface 156 and the processor 158. In another example, the camera system 100 may comprise processor/SoC 102, the capture device 104, the IR illumination device 106, the white light source 108, the structured light projector 110, the processor 158, the lens 160, the structured light pattern lens 162, and the sensors 164 as one device, and the memory 150, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

The processor 102 may be implemented as a video processor. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames.

The white light source 108 may be configured to provide light in the visible spectrum (e.g., white light). The white light illumination provided by the white light source 108 may provide illumination in low light and/or zero light environments. The capture device 104 may capture the pixel data comprising a background image (e.g., the environment) illuminated by the visible light and/or illuminated by the IR light from the IR illumination device 106.

The IR illumination device 106 may be configured to generate an output (e.g., IRL). The output IRL may comprise the IR illumination generated. The output IRL may comprise a number of (e.g., n) components. For example, the IR illumination device 106 may comprise an addressable array of IR illumination outputs that may each be configured to generate a component of the output IRL. The white light source 108 may be configured to generate an output (e.g., WL). The output WL may comprise the visible light generated. In some embodiments, the white light source 108 may comprise an addressable array of white light source outputs that may each be configured to generate a component of the output WL.

In various embodiments, the camera system 100 may be configured to utilize one or more white light LEDs as the white light source 108 and one or more infrared (IR) LEDs and/or VCSELs as the IR illumination device 106 to provide both visible and infrared light illumination in zero light environments. The amount of visible light illumination needed to provide color information may be significantly less than a conventional camera employing only visible light sources. In various embodiments, the camera system 100 may be provided that utilizes less power, has a smaller form factor, and has lower cost than cameras integrating full spot light capability. Applications may include, but are not limited to, video doorbell cameras, exterior and/or interior surveillance/security cameras, vehicle cabin monitoring cameras, and battery powered cameras.

The structured light projector 110 may be configured to generate a structured light pattern (e.g., a speckle pattern). The structured light pattern generated by the structured light projector 110 may be projected onto a background (e.g., the environment). The capture device 104 may capture the pixel data comprising a background image (e.g., the environment) with the speckle pattern. The speckle pattern may be configured to enable monocular 3D reconstruction. For example, the structured light projector 110 may enable disparity maps and/or depth maps to be generated.

The memory 150 may store data. The memory 150 may implement various types of memory including, but not limited to, a cache, flash memory, memory card, random access memory (RAM), dynamic RAM (DRAM) memory, etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets and/or metadata information. In some embodiments, the memory 150 may store reference images. The reference images may be used for computer vision operations, 3D reconstruction, adjusting an amount of IR illumination, etc. In some embodiments, the reference images may comprise reference structured light images.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, liveness detection CNN, IR illumination adjustment, etc.) stored in the memory 150. In an example, the memory 150 may store one or more directed acyclic graphs (DAGs) and one or more sets of weights and biases defining the one or more artificial neural network models. The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the camera system 100. The dynamic driver mechanism for a rolling shutter sensor may be configured to conserve power consumption. Reducing the power consumption may enable the camera system 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a DisplayPort interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the camera system 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

In some embodiments, the communications module 154 and/or the wireless interface 156 may be configured to receive user input. The user input may enable a user to adjust operating parameters for various features implemented by the processor 102. In some embodiments, the communications module 154 and/or the wireless interface 156 may be configured to interface (e.g., using an application programming interface (API) with an application (e.g., an app). For example, the app may be implemented on a smartphone to enable an end user to adjust various settings and/or parameters for the various features implemented by the processor 102 (e.g., set video resolution, select frame rate, select output format, set tolerance parameters for 3D reconstruction, etc.).

The processor 158 may be implemented using a general purpose processor circuit. The processor 158 may be operational to interact with the video processing circuit 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the camera system 100 (e.g., the battery 152, the communication module 154 and/or the wireless interface 156). Which of the functionality of the camera system 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames). For example, the capture devices 104 may receive focused light from the lens 160. The lens 160 may be directed, tilted, panned, zoomed and/or rotated to provide a targeted view from the camera system 100 (e.g., a view for a video frame, a view for a panoramic video frame captured using multiple camera systems 100*a*-100*n*, a target image and reference image view for stereo vision, etc.). The capture device 104 may generate a signal (e.g., VIDEO) and/or a signal (e.g., IRSTR). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals. The signal IRSTR may comprise a measurement of an amount of IR light detected. The signal IRSTR may be presented to one of the inputs of the processor 102. In some embodiments, the signal IRSTR may comprise metadata that may be appended to the pixel data in the signal VIDEO.

In an example, the capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the camera system 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102. The signal VIDEO may represent the video frames/video data. The signal VIDEO may be a video stream captured by the capture device 104. In some embodiments, the signal VIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. The signal VIDEO may be images comprising a background (e.g., objects and/or the environment captured) and the speckle pattern generated by the structured light projector 110. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be implemented as an RGB sensor, an RGB-IR sensor, an RCCB sensor, a monocular image sensor, stereo image sensors, a thermal sensor, etc. For example, the image sensor 180 may be any type of sensor configured to provide sufficient output for computer vision operations to be performed on the output data (e.g., neural network-based detection). In the context of the embodiment shown, the image sensor 180 may be configured to generate an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light. The image sensor 180 may be configured to convert the measured strength of the IR light into a computer readable value (e.g., provided in the signal IRSTR).

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The structured light projector 110 may comprise a block (or circuit) 186. The circuit 186 may implement a structured light source. The structured light source 186 may be configured to generate a signal (e.g., SLP). The signal SLP may be a structured light pattern (e.g., a speckle pattern). The signal SLP may be projected onto an environment near the camera system 100. The structured light pattern SLP may be captured by the capture device 104 as part of the light input LIN.

The structured light pattern lens 162 may be a lens for the structured light projector 110. The structured light pattern lens 162 may be configured to enable the structured light SLP generated by the structured light source 186 of the structured light projector 110 to be emitted while protecting the structured light source 186. The structured light pattern lens 162 may be configured to decompose the laser light pattern generated by the structured light source 186 into a pattern array (e.g., a dense dot pattern array for a speckle pattern).

In an example, the structured light source 186 may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern (e.g., the signal SLP). The lens is generally configured to decompose the laser light pattern to a dense dot pattern array. In an example, the structured light source 186 may implement a near infrared (NIR) light source. In various embodiments, the light source of the structured light source 186 may be configured to emit light with a wavelength of approximately 940 nanometers (nm), which is not visible to the human eye. However, other wavelengths may be utilized. In an example, a wavelength in a range of approximately 800-1000 nm may be utilized.

The sensors 164 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 164 may be configured to detect motion anywhere in the field of view monitored by the camera system 100 (or in some locations outside of the field of view). In various embodiments, the detection of motion may be used as one threshold for activating the capture device 104. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. In one example, the HID 166 may be configured to receive a password input from a user. In another example, the HID 166 may be configured to receive user input in order to provide various parameters and/or settings to the processor 102 and/or the memory 150. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication.

The processor/SoC 102 may receive the signal VIDEO, IRSTR and the signal SENS. The processor/SoC 102 may generate one or more video output signals (e.g., VIDOUT), one or more control signals (e.g., CTRL) and/or one or more depth data signals (e.g., DIMAGES) based on the signal VIDEO, the signal SENS, and/or other input. In some embodiments, the signals VIDOUT, DIMAGES and CTRL may be generated based on analysis of the signal VIDEO and/or objects detected in the signal VIDEO.

The processor/SoC 102 may be further configured to generate an output signal (e.g., SL_TRIG), an output signal (e.g., ZONES) and/or an output signal (e.g., WTON). The signal SL_TRIG may be configured to trigger (e.g., activate) the structured light projector 110. The output SLP may be generated in response to the signal SL_TRIG. The signal WTON may be configured to activate/deactivate the white light source 108. The output WL may be generated in response to the signal WTON. The signal ZONES may be configured to address the IR illumination device 106. The output IRL may be generated in response to the signal ZONES. The signal ZONES may comprise one or more components. The components of the signal ZONES may be configured to individually address components of the IR illumination device 106. For example, the signal ZONES may be configured to independently adjust an amount (or strength) of the IR illumination generated by the components of the IR illumination device 106. The processor/SoC 102 may generate other output signals (not shown). The number and/or format of the output signals generated by the processor/SoC 102 may be varied according to the design criteria of a particular implementation.

In various embodiments, the processor/SoC 102 may be configured to perform one or more of feature extraction, object detection, object tracking, 3D reconstruction, liveness detection and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data and/or the depth data signal DIM- AGES comprising disparity maps and depth maps from the signal VIDEO. The video output signal VIDOUT and/or the depth data signal DIMAGES may be presented to the memory 150, the communications module 154, and/or the wireless interface 156. In some embodiments, the video signal VIDOUT and/or the depth data signal DIMAGES may be used internally by the processor 102 (e.g., not presented as output).

The signal VIDOUT may be presented to the communication device 156. In some embodiments, the signal VIDOUT may comprise encoded video frames generated by the processor 102. In some embodiments, the encoded video frames may comprise a full video stream (e.g., encoded video frames representing all video captured by the capture device 104). The encoded video frames may be encoded, cropped, stitched and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal VIDOUT may be data generated by the processor 102 (e.g., video analysis results, audio/speech analysis results, etc.) that may be communicated to a cloud computing service in order to aggregate information and/or provide training data for machine learning (e.g., to improve object detection, to improve audio detection, to improve liveness detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operations of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on a type of object detected (e.g., a person, an animal, a vehicle, etc.). The signal CTRL may be generated in response to particular types of objects being detected in particular locations. The signal CTRL may be generated in response to user input in order to provide various parameters and/or settings to the processor 102 and/or the memory 150. The processor 102 may be configured to generate the signal CTRL in response to sensor fusion operations (e.g., aggregating information received from disparate sources). The processor 102 may be configured to generate the signal CTRL in response to results of liveness detection performed by the processor 102. The conditions for generating the signal CTRL may be varied according to the design criteria of a particular implementation.

The signal DIMAGES may comprise one or more of depth maps and/or disparity maps generated by the processor 102. The signal DIMAGES may be generated in response to 3D reconstruction performed on the monocular single-channel images. The signal DIMAGES may be generated in response to analysis of the captured video data and the structured light pattern SLP.

The multi-step approach to activating and/or disabling the capture device 104 based on the output of the motion sensor 164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 102 may be on and other components of the camera system 100 (e.g., the image capture device 104, the memory 150, the communications module 154, etc.) may be off. In another example, the camera system 100 may operate in an intermediate state. In the intermediate state, the image capture device 104 may be on and the memory 150 and/or the communications module 154 may be off. In yet another example, the camera system 100 may operate in a power-on (or high power) state. In the power-on state, the sensors 164, the processor/SoC 102, the capture device 104, the memory 150, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

In some embodiments, the camera system 100 may be implemented as a system on chip (SoC). For example, the camera system 100 may be implemented as a printed circuit board comprising one or more components. The camera system 100 may be configured to perform intelligent video analysis on the video frames of the video. The camera system 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the camera system 100 (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded, video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 102 within the camera system 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

The camera sensor 180 may implement a high-resolution sensor. Using the high resolution sensor 180, the processor 102 may combine over-sampling of the image sensor 180 with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline. The circuits 190a-190n may be configured to receive the pixel data VIDEO, generate the video frames from the pixel data, perform various operations on the video frames (e.g., de-warping, rolling shutter correction, cropping, upscaling, image stabilization, 3D reconstruction, liveness detection, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190a-190n may be configured to implement various security features (e.g., secure boot, I/O virtualization, etc.). Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020, U.S. patent application Ser. No. 16/288,922, filed on Feb. 28, 2019, U.S. patent application Ser. No. 15/593,493 (now U.S. Pat. No. 10,437,600), filed on May 12, 2017, U.S. patent application Ser. No. 15/931,942, filed on May 14, 2020, U.S. patent application Ser. No. 16/991,344, filed on Aug. 12, 2020, U.S. patent application Ser. No. 17/479,034, filed on Sep. 20, 2021, appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, 3D reconstruction, depth map generation, liveness detection, etc.) to be performed locally by the camera system 100.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190*a*-190*n* and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190*a*-190*n* (e.g., 190*b*) may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

In the example shown, the artificial neural network 190*b* may implement a convolutional neural network (CNN) module. The CNN module 190*b* may be configured to perform the computer vision operations on the video frames. The CNN module 190*b* may be configured to implement recognition of objects through multiple layers of feature detection. The CNN module 190*b* may be configured to calculate descriptors based on the feature detection performed. The descriptors may enable the processor 102 to determine a likelihood that pixels of the video frames correspond to particular objects (e.g., a particular make/model/year of a vehicle, identifying a person as a particular individual, detecting a type of animal, detecting characteristics of a face, etc.).

The CNN module 190*b* may be configured to implement convolutional neural network capabilities. The CNN module 190*b* may be configured to implement computer vision using deep learning techniques. The CNN module 190*b* may be configured to implement pattern and/or image recognition using a training process through multiple layers of feature-detection. The CNN module 190*b* may be configured to conduct inferences against a machine learning model.

The CNN module 190*b* may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190*b* to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190*b* using dedicated hardware circuitry may enable calculating descriptor matching distances in real time.

The CNN module 190*b* may be configured to perform face detection, face recognition and/or liveness judgment. For example, face detection, face recognition and/or liveness judgment may be performed based on a trained neural network implemented by the CNN module 190*b*. In some embodiments, the CNN module 190*b* may be configured to generate the depth image from the structured light pattern. The CNN module 190*b* may be configured to perform various detection and/or recognition operations and/or perform 3D recognition operations.

The CNN module 190*b* may be a dedicated hardware module configured to perform feature detection of the video frames. The features detected by the CNN module 190*b* may be used to calculate descriptors. The CNN module 190*b* may determine a likelihood that pixels in the video frames belong to a particular object and/or objects in response to the descriptors. For example, using the descriptors, the CNN module 190*b* may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190*b* as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190*b* may be configured to perform the feature detection on the video frames in order to generate the descriptors. The CNN module 190*b* may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190*b* may be configured to perform local masking to the region with the high likelihood of matching the particular object(s) to detect the object.

In some embodiments, the CNN module 190*b* may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190*b* may be pre-trained (e.g., configured to perform computer vision to detect objects based on the training data received to train the CNN module 190*b*).

For example, the results of training data (e.g., a machine learning model) may be pre-programmed and/or loaded into the processor 102. The CNN module 190b may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The CNN module 190b may implement the feature extraction and/or object detection by performing convolution operations. The convolution operations may be hardware accelerated for fast (e.g., real-time) calculations that may be performed while consuming low power. In some embodiments, the convolution operations performed by the CNN module 190b may be utilized for performing the computer vision operations. In some embodiments, the convolution operations performed by the CNN module 190b may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogeneous processing resources (all circuits 190a-190n may have the same capabilities) or heterogeneous processing resources (two or more circuits 190a-190n may have different capabilities).

Figure 4:
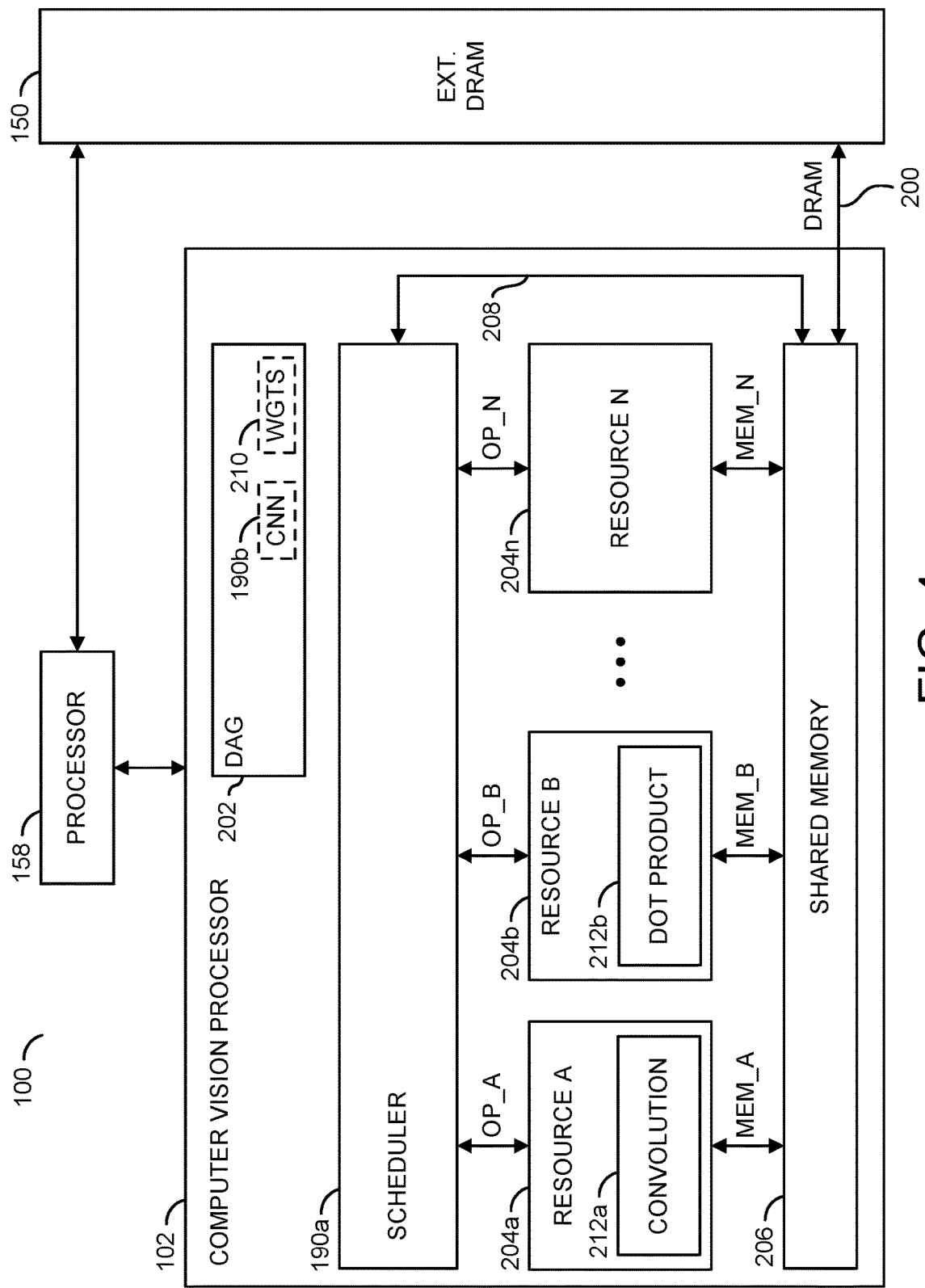
FIG. 4 is a diagram illustrating processing circuitry of a camera system implementing a convolutional neural network configured to perform object-based IR illumination control using neural network models.

Referring to FIG. 4, a diagram illustrating processing circuitry of a camera system implementing a convolutional neural network configured to perform object-based IR illumination control using neural network models is shown. In an example, processing circuitry of the camera system 100 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processing circuitry of the camera system 100 generally comprises hardware circuitry that is optimized to provide a high performance image processing and computer vision pipeline in a minimal area and with minimal power consumption. In an example, various operations used to perform image processing, feature detection/extraction, 3D reconstruction, liveness detection, depth map generation and/or object detection/classification for computer (or machine) vision may be implemented using hardware modules designed to reduce computational complexity and use resources efficiently.

In an example embodiment, the processing circuit 100 may comprise the processor 102, the memory 150, the general purpose processor 158 and/or a memory bus 200. The general purpose processor 158 may implement a first processor. The processor 102 may implement a second processor. In an example, the circuit 102 may implement a computer vision processor. In an example, the processor 102 may be an intelligent vision processor. The memory 150 may implement an external memory (e.g., a memory external to the circuits 158 and 102). In an example, the circuit 150 may be implemented as a dynamic random access memory (DRAM) circuit. The processing circuitry of the camera system 100 may comprise other components (not shown). The number, type and/or arrangement of the components of the processing circuitry of the camera system 100 may be varied according to the design criteria of a particular implementation.

The general purpose processor 158 may be operational to interact with the circuit 102 and the circuit 150 to perform various processing tasks. In an example, the processor 158 may be configured as a controller for the circuit 102. The processor 158 may be configured to execute computer readable instructions. In one example, the computer readable instructions may be stored by the circuit 150. In some embodiments, the computer readable instructions may comprise controller operations. The processor 158 may be configured to communicate with the circuit 102 and/or access results generated by components of the circuit 102. In an example, the processor 158 may be configured to utilize the circuit 102 to perform operations associated with one or more neural network models.

In an example, the processor 102 generally comprises the scheduler circuit 190a, a block (or circuit) 202, one or more blocks (or circuits) 204a-204n, a block (or circuit) 206 and a path 208. The block 202 may implement a directed acyclic graph (DAG) memory. The DAG memory 202 may comprise the CNN module 190b and/or weight/bias values 210. The blocks 204a-204n may implement hardware resources (or engines). The block 206 may implement a shared memory circuit. In an example embodiment, one or more of the circuits 204a-204n may comprise blocks (or circuits) 212a-212n. In the example shown, the circuit 212a and the circuit 212b are implemented as representative examples in the respective hardware engines 204a-204b. One or more of the circuit 202, the circuits 204a-204n and/or the circuit 206 may be an example implementation of the hardware modules 190a-190n shown in association with FIG. 3.

In an example, the processor 158 may be configured to program the circuit 102 with one or more pre-trained artificial neural network models (ANNs) including the convolutional neural network (CNN) 190b having multiple output frames in accordance with embodiments of the invention and weights/kernels (WGTS) 210 utilized by the CNN module 190b. In various embodiments, the CNN module 190b may be configured (trained) for operation in an edge device. In an example, the processing circuitry of the camera system 100 may be coupled to a sensor (e.g., video camera, etc.) configured to generate a data input. The processing circuitry of the camera system 100 may be configured to generate one or more outputs in response to the data input from the sensor based on one or more inferences made by executing the pre-trained CNN module 190b with the weights/kernels (WGTS) 210. The operations performed by the processor 158 may be varied according to the design criteria of a particular implementation.

In various embodiments, the circuit 150 may implement a dynamic random access memory (DRAM) circuit. The circuit 150 is generally operational to store multidimensional arrays of input data elements and various forms of output data elements. The circuit 150 may exchange the input data elements and the output data elements with the processor 158 and the processor 102.

The processor 102 may implement a computer vision processor circuit. In an example, the processor 102 may be configured to implement various functionality used for computer vision. The processor 102 is generally operational to perform specific processing tasks as arranged by the processor 158. In various embodiments, all or portions of the processor 102 may be implemented solely in hardware. The processor 102 may directly execute a data flow directed to execution of the CNN module 190b, and generated by software (e.g., a directed acyclic graph, etc.) that specifies processing (e.g., computer vision, 3D reconstruction, liveness detection, etc.) tasks. In some embodiments, the processor 102 may be a representative example of numerous computer vision processors implemented by the processing circuitry of the camera system 100 and configured to operate together.

In an example, the circuit 212a may implement convolution operations. In another example, the circuit 212b may be configured to provide dot product operations. The convolution and dot product operations may be used to perform computer (or machine) vision tasks (e.g., as part of an object detection process, etc.). In yet another example, one or more of the circuits 204c-204n may comprise blocks (or circuits) 212c-212n (not shown) to provide convolution calculations in multiple dimensions. In still another example, one or more of the circuits 204a-204n may be configured to perform 3D reconstruction tasks.

In an example, the circuit 102 may be configured to receive directed acyclic graphs (DAGs) from the processor 158. The DAGs received from the processor 158 may be stored in the DAG memory 202. The circuit 102 may be configured to execute a DAG for the CNN module 190b using the circuits 190a, 204a-204n, and 206.

Multiple signals (e.g., OP_A-OP_N) may be exchanged between the circuit 190a and the respective circuits 204a-204n. Each of the signals OP_A-OP_N may convey execution operation information and/or yield operation information. Multiple signals (e.g., MEM_A-MEM_N) may be exchanged between the respective circuits 204a-204n and the circuit 206. The signals MEM_A-MEM_N may carry data. A signal (e.g., DRAM) may be exchanged between the circuit 150 and the circuit 206. The signal DRAM may transfer data between the circuits 150 and 190a (e.g., on the transfer path 208).

The scheduler circuit 190a is generally operational to schedule tasks among the circuits 204a-204n to perform a variety of computer vision related tasks as defined by the processor 158. Individual tasks may be allocated by the scheduler circuit 190a to the circuits 204a-204n. The scheduler circuit 190a may allocate the individual tasks in response to parsing the directed acyclic graphs (DAGs) provided by the processor 158. The scheduler circuit 190a may time multiplex the tasks to the circuits 204a-204n based on the availability of the circuits 204a-204n to perform the work.

Each circuit 204a-204n may implement a processing resource (or hardware engine). The hardware engines 204a-204n are generally operational to perform specific processing tasks. The hardware engines 204a-204n may be implemented to include dedicated hardware circuits that are optimized for high-performance and low power consumption while performing the specific processing tasks. In some configurations, the hardware engines 204a-204n may operate in parallel and independent of each other. In other configurations, the hardware engines 204a-204n may operate collectively among each other to perform allocated tasks.

The hardware engines 204a-204n may be homogenous processing resources (e.g., all circuits 204a-204n may have the same capabilities) or heterogeneous processing resources (e.g., two or more circuits 204a-204n may have different capabilities). The hardware engines 204a-204n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In an example, the hardware engines 204a-204n may comprise matrices stored in various memory buffers. The matrices stored in the memory buffers may enable initializing the convolution operator. The convolution operator may be configured to efficiently perform calculations that are repeatedly performed for convolution functions. In an example, the hardware engines 204a-204n implementing the convolution operator may comprise multiple mathematical circuits configured to handle multi-bit input values and operate in parallel. The convolution operator may provide an efficient and versatile solution for computer vision and/or 3D reconstruction by calculating convolutions (also called cross-correlations) using a one-dimensional or higher-dimensional kernel. The convolutions may be useful in computer vision operations such as object detection, object recognition, edge enhancement, image smoothing, etc. Techniques and/or architectures implemented by the invention may be operational to calculate a convolution of an input array with a kernel. Details of the convolution operator may be described in association with U.S. Pat. No. 10,310,768, filed on Jan. 11, 2017, appropriate portions of which are hereby incorporated by reference.

In various embodiments, the hardware engines 204a-204n may be implemented solely as hardware circuits. In some embodiments, the hardware engines 204a-204n may be implemented as generic engines that may be configured through circuit customization and/or software/firmware to operate as special purpose machines (or engines). In some embodiments, the hardware engines 204a-204n may instead be implemented as one or more instances or threads of program code executed on the processor 158 and/or one or more processors 102, including, but not limited to, a vector processor, a central processing unit (CPU), a digital signal processor (DSP), or a graphics processing unit (GPU). In some embodiments, one or more of the hardware engines 204a-204n may be selected for a particular process and/or thread by the scheduler 190a. The scheduler 190a may be configured to assign the hardware engines 204a-204n to particular tasks in response to parsing the directed acyclic graphs stored in the DAG memory 202.

The circuit 206 may implement a shared memory circuit. The shared memory 206 may be configured to store data in response to input requests and/or present data in response to output requests (e.g., requests from the processor 158, the DRAM 150, the scheduler circuit 190a and/or the hardware engines 204a-204n). In an example, the shared memory circuit 206 may implement an on-chip memory for the computer vision processor 102. The shared memory 206 is generally operational to store all of or portions of the multidimensional arrays (or vectors) of input data elements and output data elements generated and/or utilized by the hardware engines 204a-204n. The input data elements may be transferred to the shared memory 206 from the DRAM circuit 150 via the memory bus 200. The output data elements may be sent from the shared memory 206 to the DRAM circuit 150 via the memory bus 200.

The path 208 may implement a transfer path internal to the processor 102. The transfer path 208 is generally operational to move data from the scheduler circuit 190a to the shared memory 206. The transfer path 208 may also be operational to move data from the shared memory 206 to the scheduler circuit 190a.

The processor 158 is shown communicating with the computer vision processor 102. The processor 158 may be configured as a controller for the computer vision processor 102. In some embodiments, the processor 158 may be configured to transfer instructions to the scheduler 190a. For example, the processor 158 may provide one or more directed acyclic graphs to the scheduler 190a via the DAG memory 202. The scheduler 190a may initialize and/or configure the hardware engines 204a-204n in response to parsing the directed acyclic graphs. In some embodiments, the processor 158 may receive status information from the scheduler 190a. For example, the scheduler 190a may provide a status information and/or readiness of outputs from the hardware engines 204a-204n to the processor 158 to enable the processor 158 to determine one or more next instructions to execute and/or decisions to make. In some embodiments, the processor 158 may be configured to communicate with the shared memory 206 (e.g., directly or through the scheduler 190a, which receives data from the shared memory 206 via the path 208). The processor 158 may be configured to retrieve information from the shared memory 206 to make decisions. The instructions performed by the processor 158 in response to information from the computer vision processor 102 may be varied according to the design criteria of a particular implementation.

Figure 5:
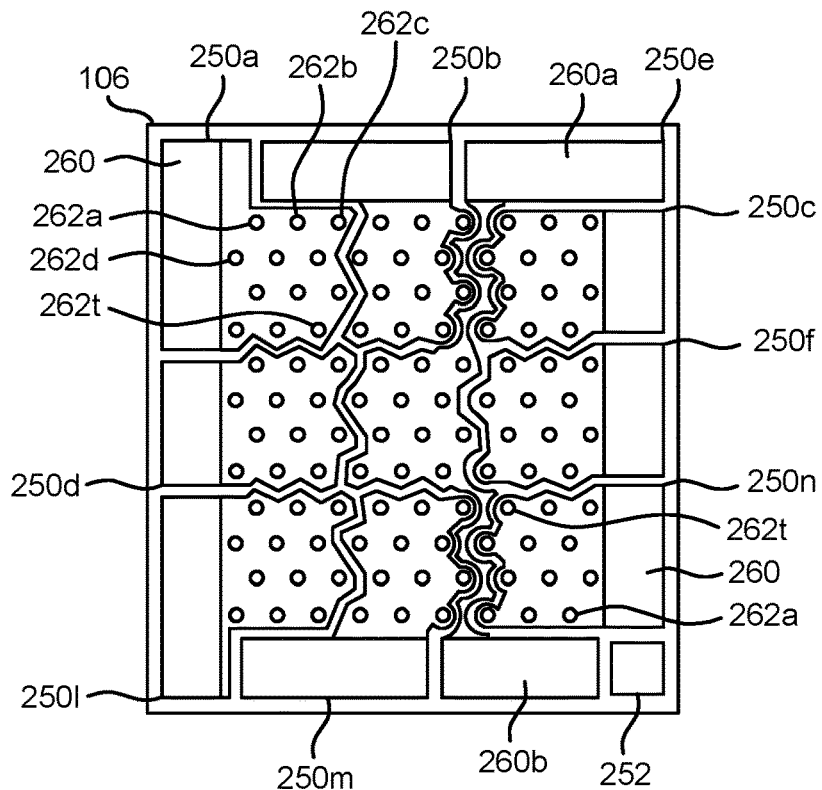
FIG. 5 is a diagram illustrating an example embodiment of a VCSEL array with addressable IR illumination segments.

Referring to FIG. 5, a diagram illustrating an example embodiment of a VCSEL array with addressable IR illumination segments is shown. An example embodiment of the IR illumination device 106 is shown. In the example shown, the IR illumination device 106 may be implemented as the VCSEL array.

The IR illumination device 106 may comprise a number of blocks (or circuits) 250a-250n and/or a block (or circuit) 252. The circuits 250a-250n may implement addressable segments. The circuit 252 may implement a chip ID. The IR illumination device 106 may comprise other components (not shown). The number, type and/or arrangement of the components of the IR illumination device 106 may be varied according to the design criteria of a particular implementation.

Each of the addressable segments 250a-250n may comprise an I/O port 260 and/or one or more emitters 262a-262t. The I/O port 260 for each of the addressable segments 250a-250n may be arranged around an outer edge of the circuit implementing the IR illumination device 106. The emitters 262a-262t may be arranged on the addressable segments 250a-250n on an inner portion of the circuit implementing the IR illumination device 106 (e.g., the active area). In the example shown, the IR illumination device 106 may comprise a 3×3 array of the addressable segments 250a-250n. The 3×3 array may divide the IR illumination device 106 into nine segments that may be generally equally sized (e.g., the addressable segment 250a may correspond to a top left section of the IR illumination device 106, the addressable segment 250b may correspond to a top middle section of the IR illumination device 106, the addressable segment 250e may correspond to a center section of the IR illumination device 106, etc.). In the example shown, each of the addressable segments 250a-250n may comprise twelve of the emitters 262a-262t. The number, type and/or arrangement of the addressable segments 250a-250n and/or the emitters 262a-262t may be varied according to the design criteria of a particular implementation.

The chip ID 252 may comprise various information about the IR illumination device 106. In an example, the processor 102 may be configured to read operating parameters and/or a status of the IR illumination device 106 from the chip ID 252. In some embodiments, the chip ID 252 may comprise firmware for the IR illumination device 106. In some embodiments, the chip ID 252 may comprise a part number and/or other manufacturing details of the IR illumination device 106. In some embodiments, the chip ID 252 may not be a circuit (e.g., the chip ID 252 may comprise printed information that may be human readable and/or a barcode/QR code).

Each of the I/O ports 260 may be configured to receive the control signal ZONES. The I/O ports 260 may enable the addressable segments 250a-250n to be independently addressed and/or controlled. Each I/O port 260 may be configured to activate/deactivate the associated emitters 262a-262t of the corresponding one of the addressable segments 250a-250n. The I/O ports 260 may be configured to convert a parameter presented in the signal ZONES (e.g., an amount of voltage, a digital value, a pulse width modulated signal, etc.) into a level of illumination generated by the emitters 262a-262t. For example, the signal ZONES may adjust the strength of IR illumination generated by the emitters 262a-262t.

The emitters 262a-262t may be configured to generate the IR light output IRL. The emitters 262a-262t may be configured to be activated and/or deactivated. The emitters 262a-262t may be configured to provide varying levels (or amounts) of IR illumination. In some embodiments, an intensity of the IR illumination generated by each of the emitters 262a-262t may be adjusted in response to the control signal ZONES. In some embodiments, the strength of the IR illumination may be adjusted by turning on/off a particular number of the emitters 262a-262t (e.g., full strength IR illumination may be generated by activating all of the emitters 262a-262t, half strength IR illumination may be generated by turning on half and turning off the other half of the emitters 262a-262t, and all of the emitters 262a-262t may be turned off to deactivate the IR illumination, etc.). The emitters 262a-262t may be grouped according to the addressable segments 250a-250n. Each group of the emitters 262a-262t may be independently controlled based on the adjustments made to the associated one of the addressable segments 250a-250n. The method of controlling the amount of IR illumination generated by the emitters 262a-262t may be varied according to the design criteria of a particular implementation.

The VCSEL implementation of the IR illumination device 106 may comprise a device mounted on a board (e.g., a printed circuit board within the housing of the camera systems 100a-100n). The light source generated by the emitters 262a-262t may comprise a directional emitting laser. Light distribution control may be suitable for an angle of view of the camera systems 100a-100n. The VCSEL implementation may implement the emitters 262a-262t that may implement surface-mounted lasers that emit in a direction perpendicular to the board that the emitters 262a-262t are implemented on. Since there may be little light leaking in the directions that are not perpendicular, light distribution may be controlled to be suitable for the angle of the view of the camera, such as a rectangular irradiation image. For example, the emitters 262a-262t may be configured to emit light horizontally from the substrate.

A bandpass filter may be implemented by the addressable segments 250a-250n to cut specific wavelengths. The bandpass filter may be attached to the sensor to prevent noise caused by sunlight during sensing. Compared to LEDs, VCSELs may have a narrower wavelength spectrum and/or smaller changes in wavelength due to temperature, resulting in less light loss due to filters. The emitters 262a-262t may provide a fast rising/falling response speed when lit with pulsed current. A pulse lighting interval may be accelerated.

In the example shown, the IR illumination device 106 may be implemented as the VCSEL array. For example, the IR illumination device 106 may be implemented using a Lumentum dToF 3J VCSEL Array (Trident-3×3 12 emitters in 3×3 arrangement for 9 addressable zones). In some embodiments, the IR illumination device 106 may be implemented using IR LEDs that may be arranged in addressable segments. Similar to the emitters 262a-262t, the IR LEDs may be independently controlled in order to adjust the amount of IR illumination provided by each of the addressable segments 250a-250n.

Figure 6:
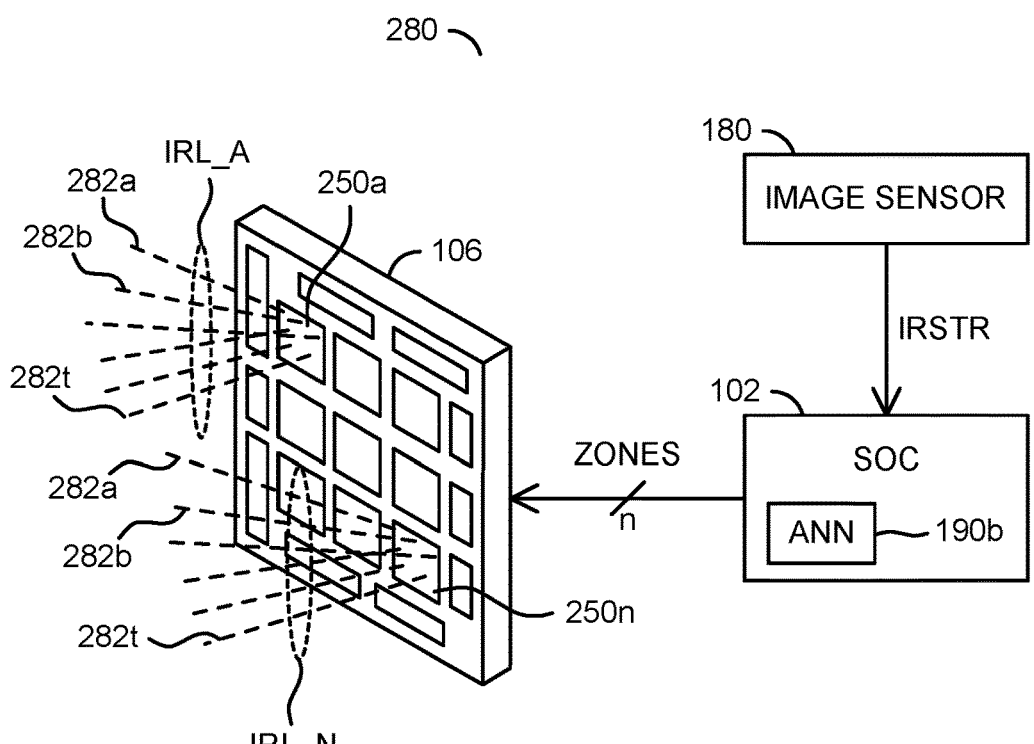
FIG. 6 is a block diagram illustrating individually addressing the IR illumination segments.

Referring to FIG. 6, a block diagram illustrating individually addressing the IR illumination segments is shown. A conceptual view 280 of one of the camera systems 100a-100n are shown. The conceptual view 280 may comprise a portion of the components implemented by the camera systems 100a-100n for illustrative purposes. The conceptual view 280 may comprise the processor/SoC 102, the IR illumination device 106 and/or the image sensor 180. The image sensor 180 may provide the signal IRSTR to the processor 102. The processor 102 may present the control signal ZONES to the IR illumination device 106.

A 3D view of the circuit implementing the IR illumination device 106 is shown. The circuit implementing the IR illumination device 106 may illustrate the general proportions of the VCSEL design. In an example, the IR illumination device 106 may be implemented having a width of approximately 0.88 μm and a height of approximately 0.98 μm. Relative to the height and width, the IR illumination device 106 may have a thin profile in order to fit the thin profile of the camera system 100b (e.g., the doorbell camera embodiment). In an example, the thickness of the IR illumination device 106 may be approximately 0.1 μm. In the example shown, the I/O ports 260 of each of the addressable segments 250a-250n may have a height/width of approximately 0.3 μm and a width/height of approximately 0.1 μm. The portion of the addressable segments 250a-250n comprising the emitters 262a-262t may have height and/or width of approximately 0.2 μm. For example, the active area of the IR illumination device 106 may have a height and/or width of approximately 0.6 μm-0.7 μm (e.g., for a 3×3 array of the addressable segments 250a-250n). The sizes of the IR illumination device 106 and/or the various components of the IR illumination device 106 may be varied according to the design criteria of a particular implementation.

Dashed lines 282a-282t are shown extending from the IR illumination device 106. In the example shown, a group of the dashed lines 282a-282t are shown extending generally from the location of the addressable segment 250a and a group of the dashed lines 282a-282t are shown generally extending generally from the location of the addressable segment 250n. Each of the dashed lines 282a-282t may be generated by a respective one of the emitters 262a-262t. The group of the dashed lines 282a-282t extending from the location of the addressable segment 250a may be a portion of the IR output IRL (e.g., IRL_A). The group of the dashed lines 282a-282t extending from the location of the addressable segment 250n may be a portion of the IR output IRL (e.g., IRL_N). For illustrative purposes, only the portion of the IR output IRL_A and the portion of the IR output IRL_N are shown. However, each of the addressable segments 250a-250n may be configured to generate a portion (e.g., IRL_A-IRL_N) of the IR output IRL.

Each of the IR output portions IRL_A-IRL_N may be independently controllable by the processor 102. In one example, the IR output portion IRL_A generated by the addressable portion 250a may be powered on (e.g., the emitters 262a-262t may be active) and the IR output portion IRL_B generated by the addressable portion 250b may be powered off (e.g., the emitters 262a-262t may be inactive). In another example, the IR output portion IRL_A generated by the addressable portion 250a may be powered on at one level of illumination strength (e.g., the emitters 262a-262t may operate at 25% strength) and the IR output portion IRL_C generated by the addressable portion 250c may be powered on at another level of illumination strength (e.g., the emitters 262a-262t may operate at 100% strength). Which of the IR output portions IRL_A-IRL_N are powered on and/or the level of IR strength that the IR output portions IRL_A-IRL_N are powered on to may depend on an amount of overexposure, depend an amount of underexposure and/or be adjusted for power savings. Which of the IR output portions IRL_A-IRL_N are powered on and/or the level of IR strength that the IR output portions IRL_A-IRL_N are powered on to may be varied according to the design criteria of a particular implementation.

The VCSEL implementation of the IR illumination device 106 may be characterized by a small size, high luminous efficiency, low power consumption and/or and high directivity. In one example, IR illumination generated by IR LEDs may have a circular light distribution with a peak in a center (in a circular pattern), while VCSELs may be surface-emitting lasers that provide IR illumination arranged in two dimensions, resulting in uniform irradiation (e.g., a more rectangular pattern). In some embodiments, a diffuser may be implemented, which may enable control of the light distribution. Compared to IR LEDs, VCSELs may a narrower wavelength spectrum. In one example, a wavelength of the IR illumination generated by the emitters 262a-262t may be approximately 940 nm. Compared to IR LEDs, the emission wavelength of the VCSEL implementation may be more stable against temperature changes. Performance may be maintained during high heat generated at high currents. Light distribution technology may enable low power draw (e.g., approximately 2-6 W of power draw) while ensuring eye safety.

Which of the IR output portions IRL_A-IRL_N are powered on and/or the level of IR strength that the IR output portions IRL_A-IRL_N are powered on to may be adjusted in real time. The processor 102 may be configured to generate the control signal ZONES to select which of the IR output portions IRL_A-IRL_N are powered on and/or the level of IR strength that the IR output portions IRL_A-IRL_N are powered on to. The signal ZONES may comprise multiple components (e.g., n components). The multiple components of the signal ZONES may be configured to independently address each of the addressable portions 250a-250n. For example, the components of the control signal ZONES may be presented to each of the I/O ports 260a-260n.

In some embodiments, the processor 102 may generate the signal ZONES in response to the signal IRSTR. In some embodiments, the processor 102 may generate the signal ZONES in response to results of the computer vision operations performed by the ANN module 190b. In some embodiments, the processor 102 may generate the signal ZONES in response to a combination of the signal IRSTR and the results of the computer vision operations.

The processor 102 may be configured to determine a region of the video frames generated that correspond to portions of the IR output IRL_A-IRL_N. For example, the processor 102 may be configured to determine that the IR output portion IRL_A generated by the addressable portion 250a may correspond to a top right region (or section) of the output video frame, the IR output portion IRL_B generated by the addressable portion 250b may correspond to a top middle region of the output video frame, the IR output portion IRL_C generated by the addressable portion 250c may correspond to a top left region of the output video frame, etc.

In some embodiments, the processor 102 may be configured to operate in a calibration mode to determine the relationship of the regions of the video frames and the locations of the output portions IRL_A-IRL_N. For example, the processor 102 may generate the signal ZONES to disable all of the addressable segments 250a-250n and then activate each one of the addressable segments 250a-250n individually in order to determine which regions of the video frames become illuminated. In some embodiments, a user may manually determine which regions of the video frames are affected by the different addressable segments 250a-250n (e.g., using a calibration board). The method of determining the regions of the video frames that correspond to the IR output portions generated by each of the addressable segments 250a-250n may be varied according to the design criteria of a particular implementation.

The IR output portions IRL_A-IRL_N and/or reflections of the IR illumination off various objects may be captured by the image sensor 180. The image sensor 180 may be configured to generate the signal IRSTR in response to the level of captured IR light. The signal IRSTR may comprise data about which of the pixels have captured IR light and/or a strength of the IR light captured. The processor 102 may be configured to determine an adjustment to each of the addressable segments 250a-250n in response to the signal IRSTR. The signal ZONES may be generated in response to the signal IRSTR.

The ANN module 190b may be configured to perform computer vision operations on the video frames generated. For example, the image sensor 180 may provide pixel data, the processor 102 may arrange the pixel data as video frames and the ANN module 190b may perform the computer vision operations. The computer vision operations may be configured to detect objects and/or characteristics of objects in the video frame. The processor 102 may use the results of the computer vision operations to determine which regions of the video frame may be adjusted (e.g., to provide more or less illumination to particular objects, to turn off all IR illumination for regions with no objects detected, to adjust IR illumination regions as the movement of an object is tracked from region to region, etc.). The processor 102 may generate the control signal ZONES in response to the results of the computer vision operations.

Figure 7:
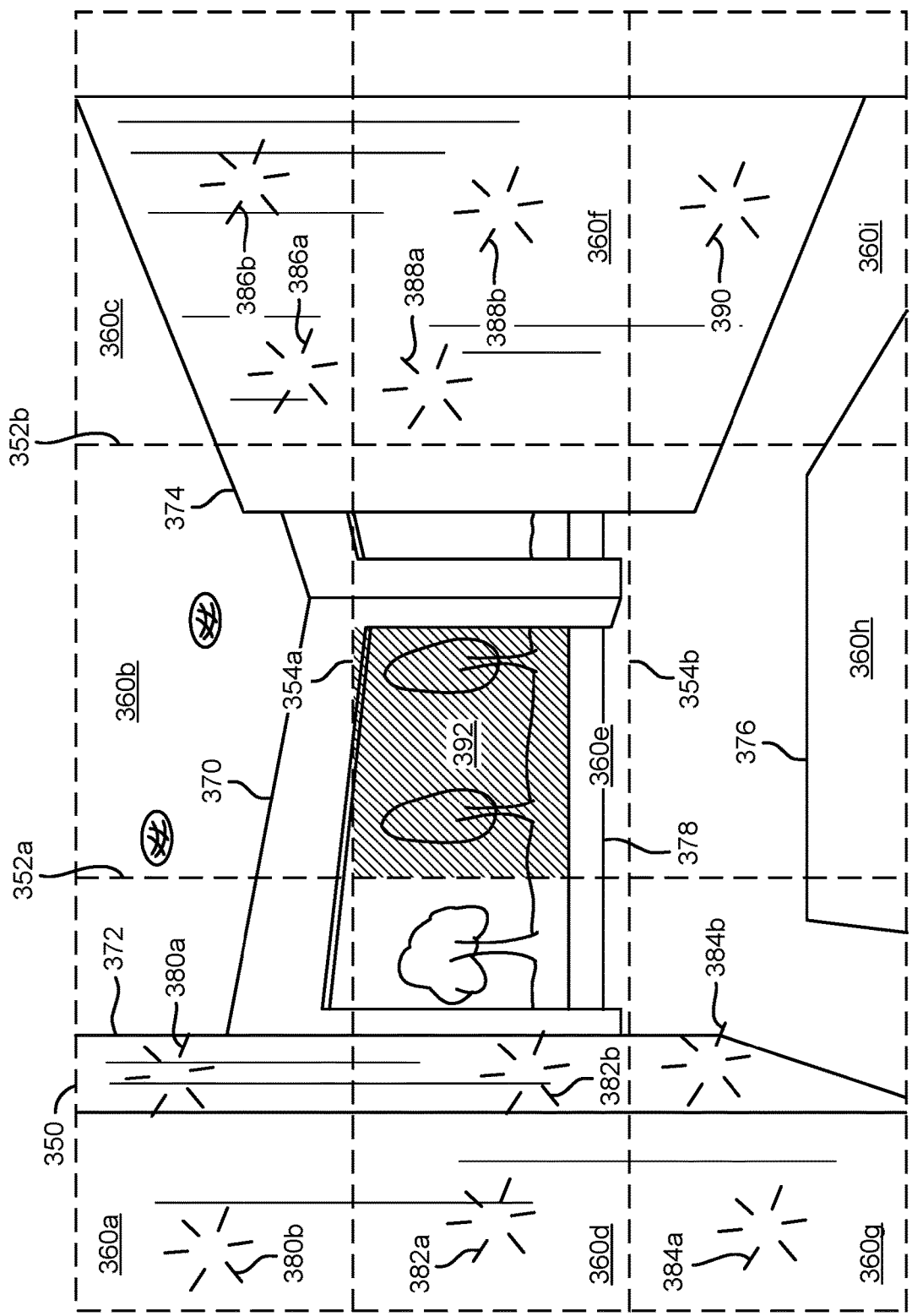
FIG. 7 is a diagram illustrating an example video frame from the perspective of a doorway used to detect regions with overexposure or underexposure.

Referring to FIG. 7, a diagram illustrating an example video frame from the perspective of a doorway used to detect regions with overexposure or underexposure is shown. An example video frame 350 is shown. The example video frame 350 may be one video frame from a sequence of video frames processed by the processor 102. The example video frame 350 may comprise the pixel data generated by the capture device 104 (e.g., the RGB-IR sensor 180) arranged as a video frame. For example, the processor 102 may receive the signal VIDEO and/or the signal IRSTR from the capture device 104.

Dashed vertical lines 352a-352b and dashed horizontal lines 354a-354b are shown overlaid on the video frame 350. The dashed vertical lines 352a-352b and the dashed horizontal lines 354a-354b may divide the video frame 350 into zones (or regions) 360a-360i. In the example shown, the zones 360a-360i may be arranged as a 3×3 array of zones. The dashed vertical lines 352a-352b and the dashed horizontal lines 354a-354b may be shown for illustrative purposes to indicate the locations of the zones 360a-360i on the video frame 350. For example, the output video frame generated by the processor 102 may not have the dashed vertical lines 352a-352b and/or the dashed horizontal lines 354a-354b shown. In some embodiments, the dashed vertical lines 352a-352b and/or the dashed horizontal lines 354a-354b may be shown on the output video frames (e.g., in a debug mode of operation).

The zones 360a-360i may correspond to the locations illuminated by the addressable segments 250a-250n of the IR illumination device 106. In an example for the video frame 350, the IR illumination device 106 may comprise nine of the addressable segments 250a-250i arranged in a 3×3 array. The portion of IR light output IRL_A generated by the emitters 262a-262t of the addressable segment 250a may affect the IR illumination captured in the zone 360a, the portion of IR light output IRL_B generated by the emitters 262a-262t of the addressable segment 250b may affect the IR illumination captured in the zone 360b, the portion of IR light output IRL_C generated by the emitters 262a-262t of the addressable segment 250c may affect the IR illumination captured in the zone 360c, the portion of IR light output IRL_D generated by the emitters 262a-262t of the addressable segment 250d may affect the IR illumination captured in the zone 360d, the portion of IR light output IRL_E generated by the emitters 262a-262t of the addressable segment 250e may affect the IR illumination captured in the zone 360e, the portion of IR light output IRL_F generated by the emitters 262a-262t of the addressable segment 250f may affect the IR illumination captured in the zone 360f, the portion of IR light output IRL_G generated by the emitters 262a-262t of the addressable segment 250g may affect the IR illumination captured in the zone 360g, the portion of IR light output IRL_H generated by the emitters 262a-262t of the addressable segment 250h may affect the IR illumination captured in the zone 360h, and the portion of IR light output IRL_I generated by the emitters 262a-262t of the addressable segment 250i may affect the IR illumination captured in the zone 360i.

In the example shown, the zones 360a-360i may be equally spaced and/or sized. In some embodiments, more or fewer zones may be implemented. For example, zones 360a-360n may be implemented depending on the number of the addressable segments 250a-250n implemented by the IR illumination device 106. Generally, the size, shape and/or spacing of each of the zones 360a-360n may depend on the size, shape and/or spacing of each of the addressable segments 250a-250n of the IR illumination device 106 and/or an arrangement of the emitters 262a-262t. In another example, the IR illumination device 106 may comprise a 5×5 array of addressable segments 250a-250n and the example video frame 350 may be divided into a 5×5 array of the zones 360a-360n. In the example shown, the zones 360a-360n may be rectangular in shape. However, other shapes may be implemented depending on the arrangement and/or locations of the emitters 262a-262t on each of the addressable segments 250a-250n. The number, type, size and/or shape of the zones 360a-360n may be varied according to the design criteria of a particular implementation.

The example video frame 350 is shown divided into the zones 360a-360i. The zones 360a-360i of the video frame 350 may comprise blocks and/or subregions of pixels of the video frames 350. In the example shown, the zones 360a-360i may comprise equally sized blocks of pixels arranged as a grid for the video frame 350. The zones 360a-360i may correspond to memory cells of the shared memory 206 in the processor 102. For example, the amount of pixel data in each of the zones 360a-360i may be limited to the amount of capacity in the shared memory 206.

The example video frame 350 may be a video frame captured of an outdoor area at an entrance of a property (e.g., a view from the camera systems 100b implementing the capture device 104 as the video doorbell embodiment). In some embodiments, the example video frame 350 may be captured in a dark environment when the IR illumination device 106 is active to generate a black and white video frame for night vision. The example video frame 350 may capture an environment comprising a ceiling 370, a left wall 372, a right wall 374, a porch 376 and a road area 378. In an example, the left wall 372 and the right wall 374 may border a doorway of a property. The example video frame 350 may comprise a perspective from a front door of a home (e.g., the lens 160 may have a similar perspective as a person standing at the front door of a home looking outwards). The porch 376 and the road area 378 may comprise a walkway area. For example, visitors to a home and/or other objects of interest may generally appear approaching the home (e.g., approaching the lens 160) and/or walking by the home in the walkway area.

The ceiling 370 may be located in the zone 360b (e.g., the top middle zone), and partially in the zone 360a (e.g., the top left zone) and the zone 360c (e.g., the top right zone). The left wall 372 may be located in the zone 360a, the zone 360d (e.g., the middle left zone) and the zone 360g (e.g., the bottom left zone). The right wall 374 may be located in the zone 360c, the zone 360f (e.g., the middle right zone) and the zone 360i (e.g., the bottom right zone) and partially in the zone 360b, the zone 360e (e.g., the center zone) and the zone 360h (e.g., the bottom middle zone). The walkway (e.g., the porch 376 and the road 378) may be in the zone 360e and the porch 376 and partially in the zone 360d, the zone 360g and the zone 360i.

Bursts of lines 380a-380b are shown on the left wall 372 in the zone 360a. Bursts of lines 382a-382b are shown on the left wall 372 in the zone 360d. Bursts of lines 384a-384b are shown on the left wall 372 in the zone 360g. The bursts of lines 380a-384b may represent an overexposure that may appear on the left wall 372. For example, the IR illumination device 106 may generate the IR light IRL, which may reflect strongly off the nearby left wall 372. A level (or strength) of the IR light reflecting off the left wall 372 may result in a washed out and/or overexposed appearance of the left wall 372 in the zone 360a, the zone 360d and the zone 360g.

Bursts of lines 386a-386b are shown on the right wall 374 in the zone 360c. Bursts of lines 388a-388b are shown on the right wall 374 in the zone 360f. A burst of lines 390 is shown on the right wall 374 in the zone 360i. The bursts of lines 386a-390 may represent an overexposure that may appear on the right wall 374. For example, the IR illumination device 106 may generate the IR light IRL, which may reflect strongly off the nearby right wall 374. The level of the IR light reflecting off the right wall 374 may result in a washed out and/or overexposed appearance of the right wall 374 in the zone 360c the zone 360f and the zone 360i.

The image sensor 180 may be configured to measure a level (e.g., the amount) of IR light captured in the pixel data (e.g., a level of reflected IR light). The image sensor 180 may present the signal IRSTR to the processor 102. The processor 102 may read the signal IRSTR to determine the measured level of IR light that may have been captured in each of the zones 360a-360i. For example, the processor 102 may cross-reference the level of IR light measured by the various pixel circuits of the image sensor 180 with the location in the video frame 350 based on the division of the zones 360a-360i in order to determine a level of IR light captured in each of the zones 360a-360i. In response to the level of IR light captured in each of the zones 360a-360i, the processor 102 may determine whether each one of the zones 360a-360i is overexposed or underexposed. The level of IR light in the signal IRSTR may be compared to a threshold value (e.g., one threshold value for overexposure and another threshold value for underexposure). The level of IR light for the overexposure threshold and the underexposure threshold may be a predefined value and/or a user configurable value. The level of IR light for the overexposure threshold and the underexposure threshold may be varied according to the design criteria of a particular implementation.

The processor 102 may detect the overexposures 380a-384b on the left wall 372 and the overexposures 386a-390 on the right wall 374 in response to an analysis of the signal IRSTR. In an example, the processor 102 may not necessarily detect the visual artifacts (e.g., represented as the bursts of lines) and/or detect the walls 372-374. In some embodiments, the processor 102 may perform the computer vision operations (to be described in association with FIGS. 8-9) to determine the location of any overexposure and/or underexposure. In some embodiments, the processor 102 may be configured to detect overexposure and/or underexposure in response to the signal IRSTR alone (or a combination of the computer vision operations and the analysis of the signal IRSTR).

The processor 102 may determine that the amount of overexposure 380a-380b in the zone 360a. In response to the overexposure 380a-380b in the zone 360a, the processor 102 may determine an amount of adjustment to the IR illumination generated for the zone 360a (e.g., how much to decrease the strength of the IR illumination IRL_A). Since the processor 102 may have determined that the emitters 262a-262t in the addressable segment 250a may correspond to the amount of IR illumination in the zone 360a, the processor 102 may generate the control signal ZONES comprising instructions for the addressable segment 250a to decrease the strength of the IR output IRL_A. Similarly, if underexposure had been detected in the zone 360a, the processor 102 may generate the signal ZONES comprising instructions for the addressable segment 250a to increase the strength of the IR output IRL_A. The amount of adjustment to the strength of the IR illumination selected by the processor 102 may depend on how much measured IR light in the signal IRSTR may have been above the overexposure threshold and/or how much the measured IR light in the signal IRSTR may have been below the underexposure threshold.

The processor 102 may perform a similar analysis and generate the signal ZONES for each of the zones 360a-360i. For example, in response to the overexposure 382a-382b, the IR strength for the zone 360d may be decreased, in response to the overexposure 384a-384b, the IR strength for the zone 360g may be decreased, in response to the overexposure 386a-386b, the IR strength for the zone 360c may be decreased, in response to the overexposure 388a-388b, the IR strength for the zone 360f may be decreased, and in response to the overexposure 390, the IR strength for the zone 360i may be decreased. The amount of IR light generated for each of the zones 360a-360i may be independently adjusted. For example, the processor 102 may determine that the overexposure 380a-380b in the zone 360a is higher than the amount of overexposure 382a-382b in the zone 360d and the signal ZONES may decrease the strength of the IR light IRL_A from the addressable segment 250a more than the decrease of the strength of the IR light IRL_D from the addressable segment 250d.

A region 392 is shown. In one example, the region 392 may represent an underexposed location in the video frame 350. The processor 102 may determine that an amount of exposure in the zone 360e may be below the underexposure threshold (e.g., the underexposure 392 in the zone 360e). In response to the underexposure 392 in the zone 360e, the processor 102 may determine an amount of adjustment to the IR illumination generated for the zone 360e (e.g., how much to increase the strength of the IR illumination). Since the processor 102 may have determined that the emitters 262a-262t in the addressable segment 250e may correspond to the amount of IR illumination in the zone 360e, the processor 102 may generate the control signal ZONES comprising instructions for the addressable segment 250e to increase the strength of the IR output IRL_E.

In some embodiments, the processor 102 may perform computer vision operations on the video frame 350. In an example, the region 392 may represent a location determined by the processor 102 to comprise a high traffic region for various objects (e.g., pedestrians, visitors approaching the home, animals, vehicles, etc.) and/or a location that is far away from the lens 160 (e.g., greater than a threshold distance). In response to the computer vision operations identifying the region 392 as a high traffic region and/or the location being beyond the threshold distance, the processor 102 may be configured to generate the control signal ZONES comprising instructions for the addressable segment 250e to increase the strength of the IR output IRL_E.

In some embodiments, the computer vision operations may be performed during a daytime (e.g., a time when there is sufficient ambient light, sufficient sunlight, sufficient white light, a time when the IR illumination device 106 is not needed, when full color video frames are generated, etc.). The computer vision performed during the daytime may be used to determine characteristics of each of the zones 360a-360i. In an example, when there is sufficient light for computer vision operations during the daytime, the processor 102 may detect locations of static (or permanently located) objects (e.g., the wall 372, the wall 374, the ceiling 370, the porch 376, etc.) and/or locations where objects of interest are most often detected. The characteristics detected using the computer vision operations at one time (e.g., the daytime) may be used for adjusting the amount of IR illumination selected for each of the zones 360a-360i at another time (e.g., at night time).

Using the addressable segments 250a-250i, the processor 102 may independently adjust the amount of IR light captured in each of the zones 360a-360i. In the example shown, there may be some portions of the zones 360a-360i that may be overexposed and other portions that may not be overexposed. For example, the portion of the wall 372 in the zone 360d may have the overexposure 382a-382b but the zone 360b may also comprise a portion of the walkway. The adjustment for the amount of IR light generated may be limited to each individual one of the zones 360a-360i. For example, a higher granularity of adjustments may be available for the IR illumination device 106 that implements more of the addressable segments 250a-250n. For example, having more than nine of the addressable segments 250a-250i may enable the processor 102 to determine that the video frame 350 may be divided into more than nine of the zones 360a-360n. For example, with additional zones only the portion of the video frame 350 comprising the wall 372 may set to the reduced IR illumination.

In the example shown, adjustments may be made in response to detecting the overexposure on the walls 372-374, while no overexposure is shown in the zone 360b, the zone 360e or the zone 360h. Even without overexposure or underexposure detected, the strength of the IR illumination may be set in response to an expected usage of each of the zones 360a-360i. For example, since the zone 360b may comprise the ceiling 370, few objects of interest may be expected to appear in the zone 360b. The IR illumination strength for the addressable segment 250b may be reduced to save power for the zone 360b. Most activity may be expected in the zone 360e and the zone 360h. More IR illumination may be selected for the zone 360e and the zone 360h based on the higher likelihood of activity and the processor 102 may set the high IR output strength for the addressable segment 250e and the addressable segment 250h. However, as objects detected approach the lens 160 (e.g., cross the threshold distance), more IR light may be reflected off the approaching object. The amount of IR light may be reduced as the object approaches the lens 160 in order to prevent the increasing level of reflected IR light off the object from resulting in overexposure.

In some embodiments, the arrangement of the addressable segments 250a-250n on the IR illumination device 106 may be designed based on the expected use case. For example, since the zones 360a-360c may comprise either the ceiling 370 or the walls 372-374, instead of implementing three of the addressable segments 250a-250i on the top row, the IR illumination device 106 may be designed with a single addressable segment for the top row (e.g., resulting in a single zone at the top of the video frame 350), and more of the addressable segments 250a-250i may be implemented in the middle row of the video frame 350 (e.g., where more activity is likely), while still implementing the same (e.g., nine) number of the addressable segments 250a-250i. For example, fewer of the addressable segments 250a-250n may be implemented for the locations in the video frame 350 that may have lower activity (e.g., less people or objects may appear), while more of the addressable segments 250a-250n may be implemented for the locations in the video frame 350 that may have higher activity (e.g., providing a greater granularity of control). In some embodiments, computer vision operations may be used to detect objects, the locations of objects and the frequency of objects that appear in the video frames. The results of the computer vision operations may be stored and later compiled to determine where objects are most likely to be located. The IR illumination device 106 may be re-designed with a higher granularity of the segments 250a-250n at locations that have more objects and a lower granularity of the segments 250a-250n at locations that have fewer objects.

Figure 8:
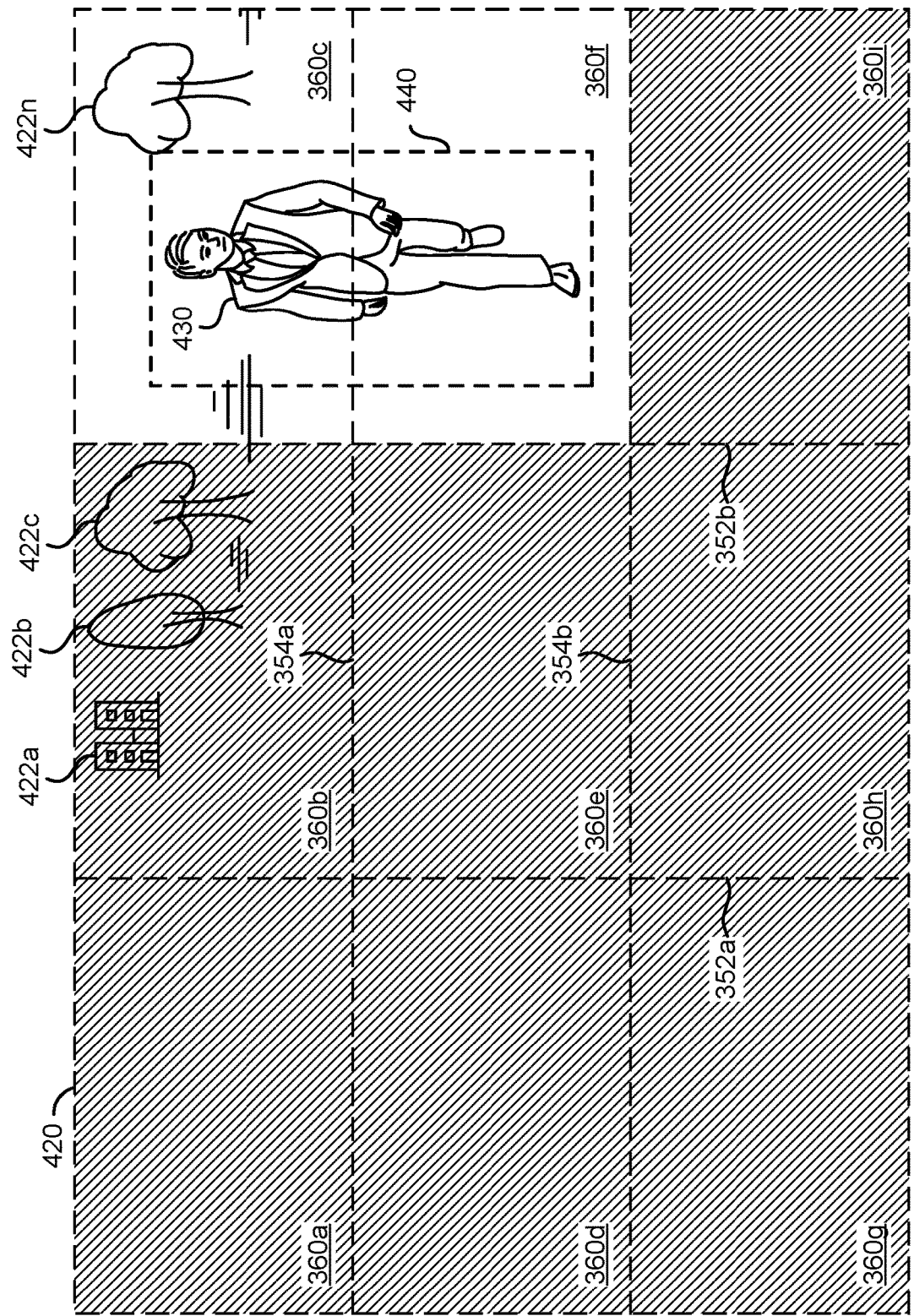
FIG. 8 is a diagram illustrating results of computer vision operations for detecting an object in an example video frame.

Referring to FIG. 8, a diagram illustrating results of computer vision operations for detecting an object in an example video frame is shown. An example video frame 420 is shown. The example video frame 420 may be an illustrative example of one video frame of a sequence of video frames analyzed/evaluated by the ANN module 190b. In one example, the example video frame 420 may be a video frame captured outdoors by a smartphone camera. In another example, the example video frame 420 may be a video captured by a smart doorbell and/or a home security camera. In the example shown, the example video frame 420 may be a video captured by a camera implemented on a vehicle driving on a roadway. The use-case for capturing and analyzing the example video frame 420 may be varied according to the design criteria of a particular implementation.

The example video frame 420 may comprise the dashed vertical lines 352a-352b and the dashed horizontal lines 354a-354b. Similar to the example video frame 350 shown in association with FIG. 7, the example video frame 420 may be divided into the zones 360a-360i. As described above, the processor 102 may associate the locations of the zones 360a-360i of the example video frame 420 with the locations in the environment that the IR illumination device 106 emits each output IR light portion IRL_A-IRL_I.

The example video frame 420 may comprise pixel data arranged as a video frame provided to the ANN module 190b. The ANN module 190b may be configured to analyze the pixel data of the video frame 420 to detect objects of interest and/or determine characteristics of the objects of interest detected (e.g., a size, a location, a distance, a classification, etc. of various types of objects/subjects) in the video frame 420. In an example, a computer vision neural network model implemented by ANN module 190b may be configured to detect various objects in the example video frame 420. The example video frame 420 may comprise a RGB-IR image. In some embodiments, a similar analysis may be performed on the video frame 420 that may comprise an RGB image, a RCCB image, a thermal image, etc. For example, the computer vision analysis may be performed to detect object types that may suffer from overexposure and/or underexposure, regardless of whether the actual amount of IR light is measured.

The example video frame 420 may comprise various objects. Not all of the objects in the example video frame 420 may be determined to be an object of interest by the neural network model implemented by the ANN module 190b. The example video frame 420 may comprise background objects 422a-422n and/or a person 430. The background object 422a may be a building and the background objects 422b-422n may be trees. Generally, the background objects 422a-422n may not be objects of interest that the computer vision operations may detect. For example, if the camera system 100b is installed for a non-moving usage scenario (e.g., a stationary security camera, a doorbell camera, trail camera, etc.), the building 422a and the trees 422b-422n may always be in the background and or may have limited changes in characteristics (e.g., the background objects 422a-422n do not move significantly, the distance, size, shape and color may not change dramatically, etc.). Other types of background objects may comprise traffic lights, street signs, roadways, dividers/barriers, etc. In the example shown, the background objects 422a-422n may be stationary objects. However, in some embodiments, the background objects 422a-422n may be movable objects. Which objects are considered the background objects 422a-422n may be determined by the neural network model implemented by the ANN module 190b.

The person 430 may be considered an object of interest. The person 430 may move through (e.g., walk across) the video frame 420. The person 430 may not always be present. Different people and/or animals may be detected at different times. In the example shown, the person 430 may be walking on a right side of the video frame 420 towards the lens 160. In the example shown, only one object of interest (e.g., the person 430) is shown. However, more objects of interest may be presented (e.g., multiple people, animals, vehicles, etc.) depending on the particular circumstances captured in the environment.

A dotted shape 440 is shown. The dotted shape 440 may represent the detection of an object/subject by the computer vision operations performed by the processor 102. The dotted shape 440 may comprise the pixel data corresponding to an object detected by the computer vision operations pipeline and/or the neural network model implemented by the ANN 190b. In the example shown, the dotted shape 440 may be detected in response to animal detection, vehicle detection and/or pedestrian detection operations performed by the ANN module 190b (e.g., the computer network model implemented by the ANN module 190b may be libraries configured to detect people, vehicles and/or animals). The dotted shape 440 is shown for illustrative purposes. In an example, the dotted shape 440 may be a visual representation of the object detection (e.g., the dotted shape 440 may not appear on an output video frame). In another example, the dotted shape 440 may be a bounding box generated by the processor 102 displayed on the output video frames to indicate that an object has been detected (e.g., the dotted shape 440 may be displayed in a debug mode of operation).

The computer vision operations may be configured to detect characteristics of the detected objects, behavior of the objects detected, a movement direction of the objects detected, a distance from the lens 160 of the objects detected and/or a liveness of the objects detected. The characteristics of the objects may comprise a height, length, width, slope, an arc length, a color, an amount of light emitted, detected text on the object, a path of movement, a speed of movement, a direction of movement, a proximity to other objects, etc. The characteristics of the detected object may comprise a status of the object (e.g., opened, closed, on, off, etc.). The characteristics of the detected object may comprise a distance measurement from the lens 160 to the detected object. The behavior and/or liveness may be determined in response to the type of object and/or the characteristics of the objects detected. While one example video frame 420 is shown, the behavior, movement direction and/or liveness of an object may be determined by analyzing a sequence of the video frames captured over time. For example, a path of movement and/or speed of movement characteristic may be used to determine that an object classified as a person may be walking or running. The types of characteristics and/or behaviors detected may be varied according to the design criteria of a particular implementation.

The detected object 440 may be located in the top right location of the video frame 420. In the example shown, the detected object 440 may be a the person 430 (e.g., an object capable of movement). In some embodiments, the detected object 440 may be a stationary object (e.g., a package delivered to a home). The processor 102 may cross-reference the location of the detected object 440 with the location of the zones 360a-360i associated with the addressable segments 250a-250i of the IR illumination device 106. The detected object 440 may be located in the zone 360c and the zone 360f. The other zones (e.g., the zones 360a-360b, the zones 360d-360e and the zones 360g-360i) may not comprise any objects of interest. For example, the background objects 422a-422c may be located in the zone 360b, but the background objects 422a-422c may not be considered objects of interest by the ANN module 190b.

The zones 360a-360b, the zones 360d-360e and the zones 360g-360i are shown shaded. The shading shown may represent that the emitters 262a-262t in the associated addressable segments 250a-250b, the addressable segments 250d-250e and the addressable segments 250g-250i may be powered off (or emitting IR light at a low level). The emitters 262a-262t of some of the addressable segments 252a-252i may be powered off in order to conserve power. In the example shown, the zones 360a-360b, the zones 360d-360e and the zones 360g-360i may be empty (e.g., without objects of interest) and to conserve power the associated addressable segments (e.g., the addressable segments 250a-250b, the addressable segments 250d-250e and the addressable segments 250g-250i) may be powered off.

The zone 360c and the zone 360f are shown without the shading. The emitters 262a-262t of the addressable segment 250c (e.g., associated with the zone 360c) and the addressable segment 250f (e.g., associated with the zone 360f) may be powered on (or adjusted to increase the strength of the IR illumination). The emitters 262a-262t may provide the IR illumination to enable and/or improve a visibility of the person 430. While the background object 422n is also provided with the IR illumination for the zone 360c, the emitters 262a-262t of the addressable segment 250c may be powered on because the detected object is in the zone 360c, and not necessarily because the background object 422n is in the zone 360c. In some embodiments, the distance to the person 430 may be determined using the computer vision operations. Since the person 430 may be far away from the lens 160, more IR light may be generated (e.g., the IR illumination for the zone 360c and the zone 360f may be increased).

In an example, the video frame 420 may be captured at night time (e.g., in a dark environment). To conserve power, the emitters 262a-262t of all of the addressable segments 250a-250i may be turned off by default. For example, normally no objects of interest may be present and the processor 102 may determine that there may be no benefit to providing the IR illumination. As the person 430 enters the video frame 420, the processor 102 may detect the person 430 as the detected object 440. The processor 102 may determine the location of the detected object 440 (e.g., which of the zones 360a-360i the person 430 occupies). Since the detected object 440 may be in the zone 360c and the zone 360f, the processor 102 may generate the control signal ZONES comprising instructions for the addressable segment 250c and the addressable segment 250f. The signal ZONES may be configured to enable (e.g., power on) the emitters 262a-262t for the addressable segment 250c and the addressable segment 250f to generate the IR output IRL comprising the IR output portion IRL_C and the IR output portion IRL_F. The image sensor 180 may capture the pixel data comprising the IR illumination provided by the IR output portion IRL_C and the IR output portion IRL_F, which may provide the IR illumination for the zone 360c and the zone 360f. With the IR illumination provided to the zone 360c and the zone 360f, the person 430 may appear in the video frame 420 with better visibility than the visibility in the other zones. For example, to conserve power, the IR illumination may be turned off, except for in the zones 360a-360i that have an object of interest present.

Figure 9:
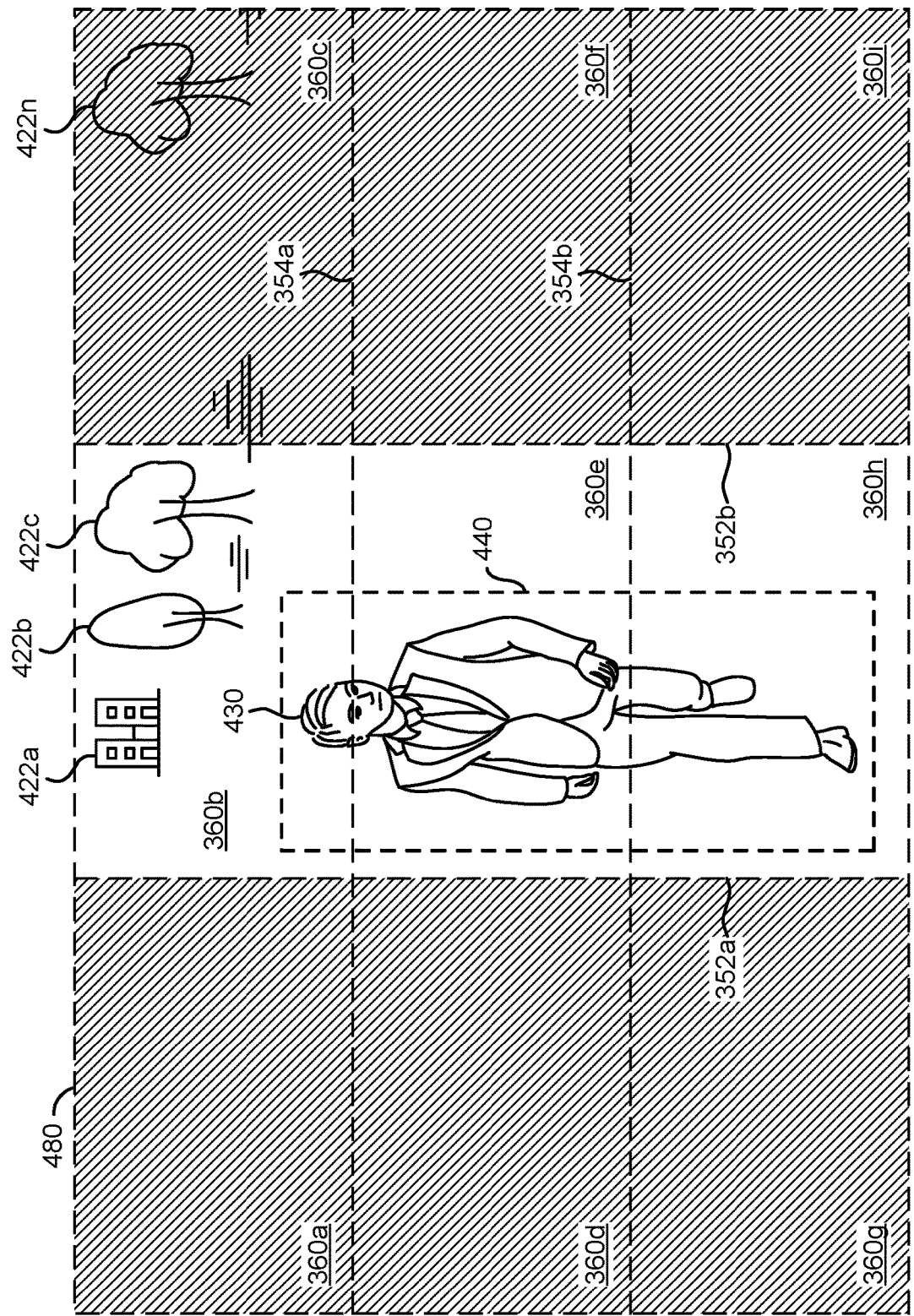
FIG. 9 is a diagram illustrating results of computer vision operations for tracking movement of an object in an example video frame.

Referring to FIG. 9, a diagram illustrating results of computer vision operations for tracking movement of an object in an example video frame is shown. An example video frame 480 is shown. The example video frame 480 may comprise a video frame of the same environment and/or same perspective as shown in the example video frame 420 shown in association with FIG. 8. The example video frame 480 may represent a video frame captured subsequent to the video frame 420. In an example, one of the camera systems 100a-100n may capture a sequence of video frames and the example video frame 480 may comprise pixel data captured at a time later than the pixel data captured for the video frame 420.

The example video frame 480 may comprise the dashed vertical lines 352a-352b and the dashed horizontal lines 354a-354b. Similar to the example video frame 420 shown in association with FIG. 8, the example video frame 480 may be divided into the zones 360a-360i. The processor 102 may be configured to perform the computer vision operations on the video frame 480 and/or adjust the amount of IR light provided by the IR illumination device 106 in response to the computer vision operations.

The processor 102 may be configured to track locations of objects over time. The example video frame 480 may comprise the background objects 422a-422n. The background objects 422a-422n may be in the same locations as in the example video frame 420 (e.g., the background objects 422a-422n may not move). The example video frame 480 may comprise the person 430. The person 430 may have moved locations since the time that the video frame 420 had been captured. In the example video frame 480, the person 430 may be within the middle column of the zones 360a-360i.

The person 430 may have moved from the top right location in the video frame 420 to the middle location in the video frame 480. The person 430 may have walked towards the lens 160. Since the person 430 may have moved closer to the lens 160, the person 430 may appear larger in the video frame 480 compared to the size of the person 430 shown in the video frame 420. The processor 102 may detect the person 430 as the detected object 440 in the video frame 480. The processor 102 may determine that the detected object 440 may be in (or partially within) the zone 360b, the zone 360e and the zone 360h.

In the video frame 480, the zone 360a, the zone 360c, the zone 360d, the zone 360f, the zone 360g and the zone 360i may be shaded and the zone 360b, the zone 360e and the zone 360h may be unshaded. The emitters 262a-262t of the addressable segments 250a-250i associated with the zone 360a, the zone 360c, the zone 360d, the zone 360f, the zone 360g and the zone 360i may be powered off (e.g., the zones with no objects present). The emitters 262a-262t of the addressable segments 250a-250i associated with the zone 360b, the zone 360e and the zone 360h may be powered on (e.g., the zones with the detected object 440).

The processor 102 may be configured to detect the location of the objects. The processor 102 may be configured to track the movement of the detected object 440 over time (e.g., over the sequence of the video frames). The processor 102 may be configured to adjust a status of the emitters 262a-262t in the addressable segments 250a-250i in response to the movement of the detected object 440.

In the example shown in association with FIG. 7, the emitters 262a-262t in the addressable segment 250c and the addressable segment 250f may have been powered on to provide the IR illumination for the zone 360c and the zone 360f occupied by the detected object 440 at a particular point in time. The processor 102 may monitor and/or track the location, characteristics and/or behavior of the detected object 440 over time. The processor 102 may be configured to determine when the detected object 440 crosses a threshold from one zone to another zone (e.g., crosses the dashed vertical lines 352a-352b and/or the dashed vertical lines 354a-354b). The processor 102 may also be configured to determine when the detected object 440 crosses a distance threshold (e.g., moves closer to the lens 160). As the detected object 440 enters a new one of the zones 360a-360i, the processor 102 may generate the control signal ZONES to power on a new one of the addressable segments 250a-250i to provide illumination for the detected object 440. As the detected object 440 leaves one of the previously illuminated one of the zones 360a-360i, the processor 102 may generate the signal ZONES to turn off the powered on one of the addressable segments 250a-250i to save power consumption.

In the example shown, the processor 102 may track the detected object 440 as the detected object 440 moves towards the lens 160. The detected object 440 may move across the zones 360a-360i and/or change size based on a distance from the lens 160. In an example, the detected object 440 may cross the vertical line 352b and start to move from the zone 360c and the zone 360f and into the zone 360b and the zone 360e. While the detected object enters the zone 360b (while still partially in the zone 360c), the processor 102 may generate the signal ZONES to enable the emitters 262a-262t of the addressable segment 250b. While the detected object enters the zone 360e (while still partially in the zone 360f), the processor 102 may generate the signal ZONES to enable the emitters 262a-262t of the addressable segment 250e. While the detected object 440 crosses the vertical threshold 352b, the detected object 440 may be partially in each of the zones 360b-360c and the zones 360e-360f. The associated addressable segments 250b-250c and the addressable segments 250e-250f of the IR illumination device 106 may all be providing the IR illumination (e.g., the IR output portions IR_B-IR_C and the IR output portions IR_E-IR_F).

As the detected object 440 moves closer to the lens 160, the detected object 440 may cross the horizontal threshold 354b and enter the zone 360h. When the detected object 440 is detected in the zone 360h, the processor 102 may generate the signal ZONES to power on the emitters 262a-262t of the addressable segment 250h.

Eventually, the detected object 440 may completely cross the vertical threshold 352b and exit the zone 360c and the zone 360f (and becomes completely within the zone 360b, the zone 360e and the zone 360h). As the detected object 440 completely exits the zone 360c, the processor 102 may generate the signal ZONES to power off the emitters 262a-262t of the addressable segment 250c. As the detected object 440 completely exits the zone 360f, the processor 102 may generate the signal ZONES to power off the emitters 262a-262t of the addressable segment 250f. When the detected object 440 is completely within the zone 360b, the zone 360e and the zone 360h, only the emitters 262a-262t of the addressable segment 250b, the addressable segment 250e and the addressable segment 250h may be powered on, as shown in the video frame 480.

As the detected object 440 approaches the lens 160, the detected object 440 may cross the distance threshold. In some embodiments, the distance threshold may be a reference distance in the video frame 480. In some embodiments, the distance threshold may be determined based on a level of IR light reflected off the detected object 440 (e.g., determined using computer vision operations to detect overexposure and/or determined based on the IR illumination data in the signal IRSTR). As the detected object 440 crosses the distance threshold, the amount of IR light generated may be decreased to prevent overexposure due to more IR light reflecting off the nearby detected object 440. In an example, due to the detected object 440 being farther away in the example video frame 420, the amount of IR light generated for the zone 360c and the zone 360f (e.g., as shown in association with FIG. 7) may be greater than the amount of IR light generated for the zone 360b, the zone 360e and the zone 360h when the detected object is closer in the example video frame 480. For example, more of the addressable segments (e.g., 250*b*, 250*e* and 250*h* compared to 250*c* and 250*f*) when the detected object 440 is closer, but the intensity of the IR light generated may be less as the detected object 440 is closer to account for the changing level of IR light reflection off the detected object 440.

In the example shown, the processor 102 may track the location of the single detected object 440. The processor 102 may perform the computer vision operations and detect multiple objects simultaneously. The processor 102 may track the location of the multiple detected objects and adjust the amount of IR illumination in the zones 360*a*-360*i* accordingly. In some embodiments, detected objects may be in all of the zones 360*a*-360*n* and the IR illumination device 106 may be adjusted to power on the emitters 262*a*-262*t* of all of the addressable segments 250*a*-250*i*. In some embodiments, there may be no detected objects present and all of the addressable segments 250*a*-250*i* may be powered off.

Figure 10:
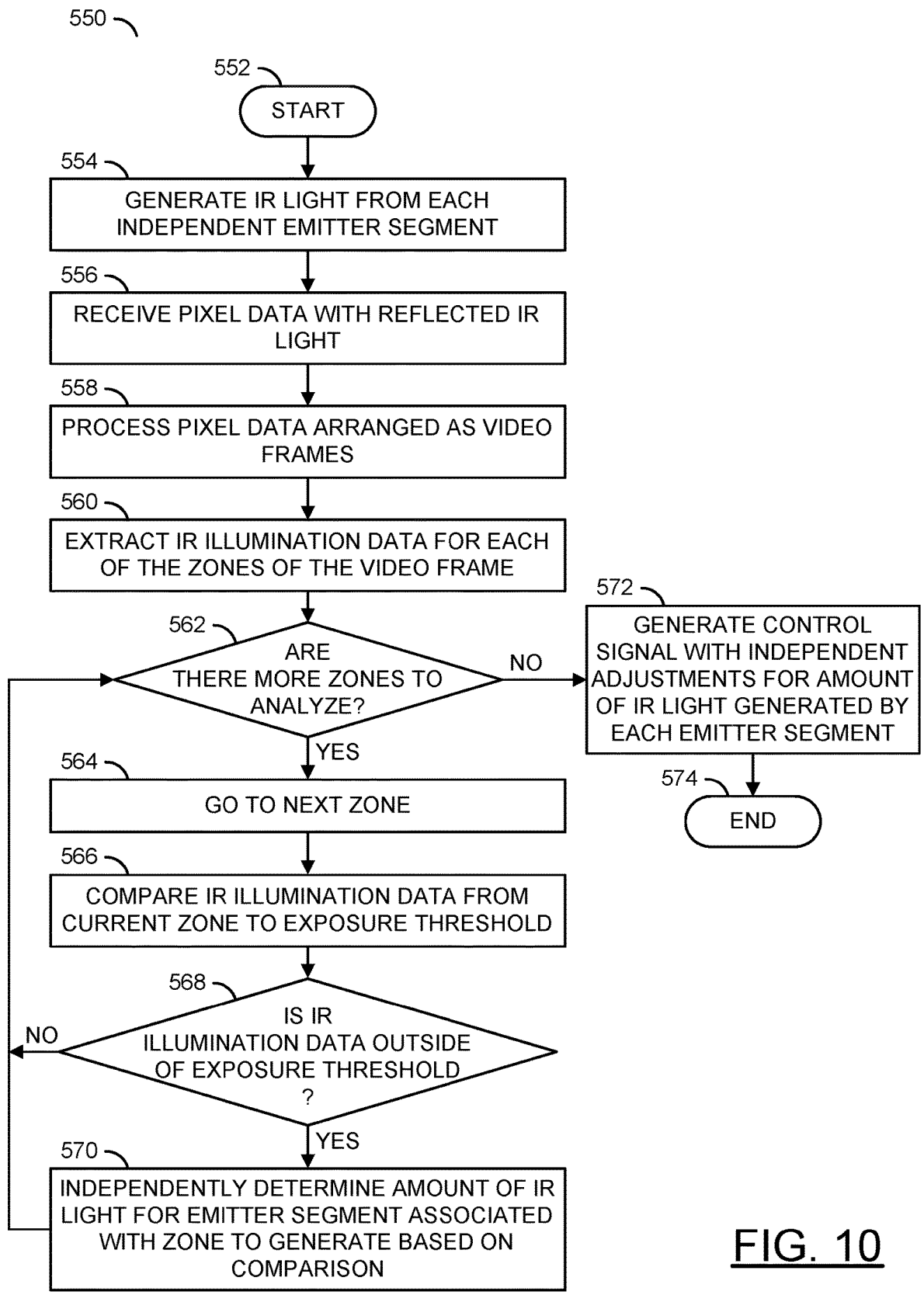
FIG. 10 is a flow diagram illustrating a method for implementing IR illumination control for cameras using a multi-region array.

Referring to FIG. 10, a method (or process) 550 is shown. The method 550 may implement IR illumination control for cameras using a multi-region array. The method 550 generally comprises a step (or state) 552, a step (or state) 554, a step (or state) 556, a step (or state) 558, a step (or state) 560, a decision step (or state) 562, a step (or state) 564, a step (or state) 566, a decision step (or state) 568, a step (or state) 570, a step (or state) 572, and a step (or state) 574.

The step 552 may start the method 550. In the step 554, the IR illumination device 106 may generate the IR light IRL_A-IRL_N from each of the independent addressable emitter segments 250*a*-250*n*. Next, in the step 556, the processor 102 may receive the pixel data comprising the reflected IR light. In an example, the image sensor 180 may capture the incoming light LIN and the capture device 104 may present the signal VIDEO and/or the signal IRSTR to the processor 102. In the step 558, the processor 102 may process the pixel data arranged as video frames. In an example, the processor 102 may generate the video frame 350 in response to the signal VIDEO. Next, in the step 560, the processor 102 may extract the IR illumination data for each of the zones 360*a*-360*n* of the video frame 350. In one example, the IR illumination data for each of the zones 360*a*-360*n* may be extracted based on the data provided in the signal IRSTR (e.g., data extracted by the image sensor 180). In another example, the IR illumination data for each of the zones 360*a*-360*n* may be extracted in response to computer vision operations performed by the processor 102 on the video frame 350 (e.g., data extracted based on the objects and/or characteristics of the features detected in the video frame 350). Next, the method 550 may move to the decision step 562.

In the decision step 562, the processor 102 may determine whether there are more of the zones 360*a*-360*n* to analyze in the video frame 350. In an example, each of the zones 360*a*-360*n* may be analyzed. In the method 550, the steps 562-570 may describe the analysis of each of the zones 360*a*-360*n* performed sequentially for illustrative purposes. However, in some embodiments, each of the zones 360*a*-360*n* may be analyzed in parallel and/or substantially in parallel. If there are more of the zones 360*a*-360*n* to analyze, then the method 550 may move to the step 564. In the step 564, the processor 102 may analyze the next one of the zones 360*a*-360*n*. Next, in the step 566, the processor 102 may compare the IR illumination data from a current one of the zones 360*a*-360*n* being analyzed to the exposure threshold. In some embodiments, each of the zones may have an independent and/or individualized exposure threshold. For example, each of the individualized exposure thresholds may be determined according to an expected amount of IR light, an expected location of objects and/or an expected type of objects that may be likely to appear in the video frame 350. Next, the method 550 may move to the decision step 568.

In the decision step 568, the processor 102 may determine whether the IR illumination data is outside of the exposure threshold. In an example, a difference between the IR light captured and the exposure threshold may be determined. If the IR illumination data is within the exposure threshold, then the method 550 may return to the decision step 562 (e.g., no adjustment to the amount of IR light may be performed). If the IR illumination data is outside of the exposure threshold, then the method 550 may move to the step 570. In the step 570, the processor 102 may determine an amount of IR light to generate by the particular one of the addressable segments 250*a*-250*n* associated with the current one of the zones 360*a*-360*n* being analyzed based on the comparison. For example, the amount of IR light emitted by each of the addressable segments 250*a*-250*n* may be independently determined and adjusted independently. Next, the method 550 may return to the decision step 562.

In the decision step 562, if there are no more of the zones 360*a*-360*n* to analyze (e.g., the amount of IR light for each of the addressable segments 250*a*-250*n* has been determined), then the method 550 may move to the step 572. In the step 572, the processor 102 may generate the signal ZONES. The signal ZONES may be a control signal that may provide independent adjustments for the amount of IR light generated by each of the addressable emitter segments 250*a*-250*n*. Next, the method 550 may move to the step 574. The step 574 may end the method 550.

Figure 11:
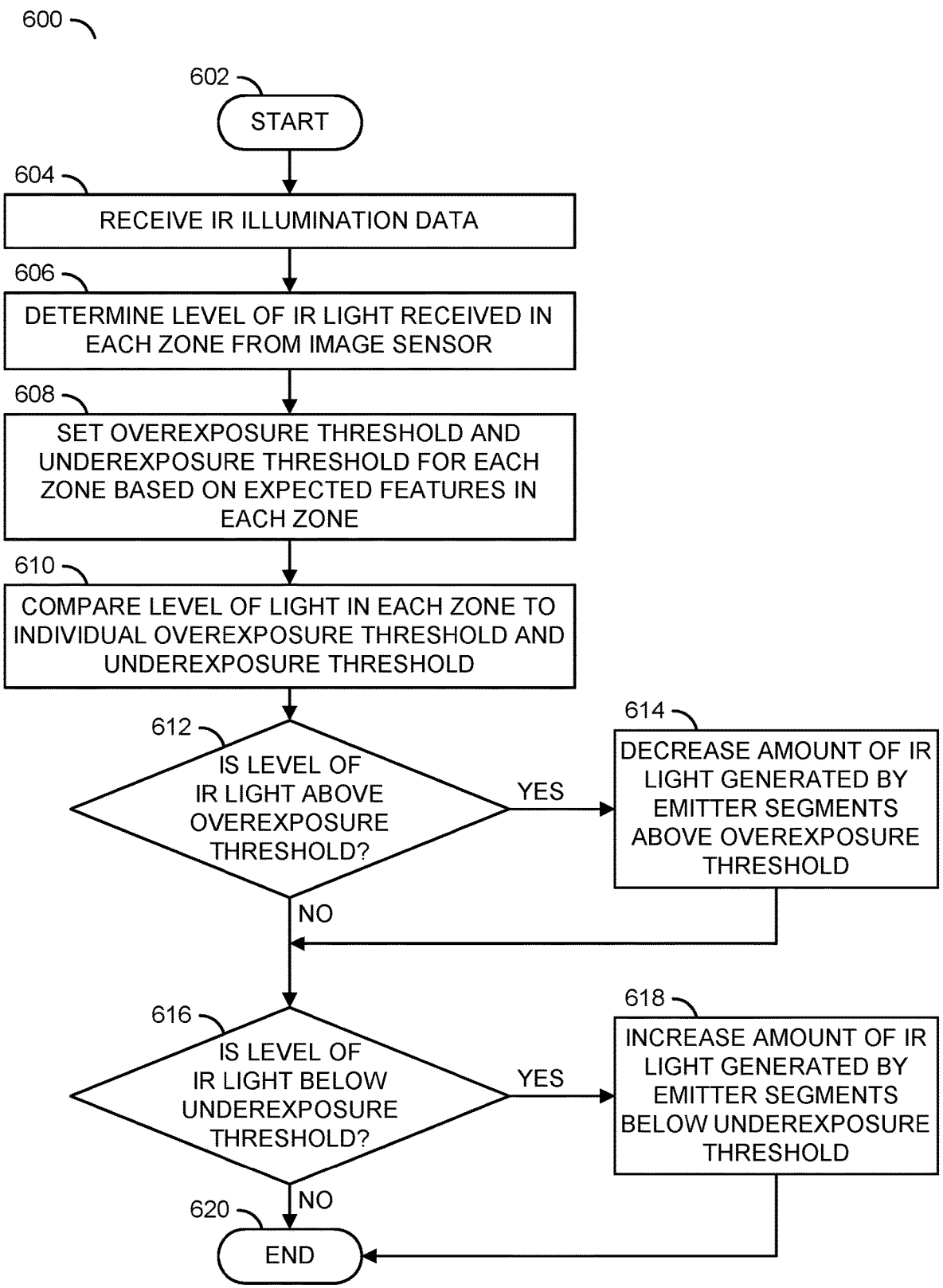
FIG. 11 is a flow diagram illustrating a method for adjusting IR illumination based on an exposure thresholds.

Referring to FIG. 11, a method (or process) 600 is shown. The method 600 may adjust IR illumination based on an exposure thresholds. The method 600 generally comprises a step (or state) 602, a step (or state) 604, a step (or state) 606, a step (or state) 608, a step (or state) 610, a decision step (or state) 612, a step (or state) 614, a decision step (or state) 616, a step (or state) 618, and a step (or state) 620.

The step 602 may start the method 600. In the step 604, the processor 102 may receive the IR illumination data. Next, in the step 606, the processor 102 may determine the level of IR light received in each of the zones 360*a*-360*n* from the image sensor 180. In an example, the image sensor 180 may extract a value for the level of IR light received at each location of the image sensor 180 and provide the levels of IR light to the processor 102 in the signal IRSTR. For example, the processor 102 may determine an average level of IR light from the pixel-level data in the signal IRSTR from the pixels that correspond to each of the zones 360*a*-360*n* to determine the level of IR illumination captured in each of the zones 360*a*-360*n*. Next, the method 600 may move to the step 608.

In the step 608, the processor 102 may set an overexposure threshold and an underexposure threshold for each of the zones 360*a*-360*n* based on the expected features in each of the zones 360*a*-360*n*. In one example, the processor 102 may perform computer vision operations on the video frames captured during the day time (or at another time when there is sufficient ambient light to perform computer vision operations). The processor 102 may determine the locations of where walls, ceilings, floors, and/or locations where objects of interest (e.g., pedestrians) may be expected to appear in the video frames. The locations of the particular types of objects may be used to determine the overexposure threshold and underexposure threshold for each of the zones 360*a*-360*n*. Next, in the step 610, processor 102 may compare the level of light in the IR illumination data to each of the individual overexposure thresholds and underexposure thresholds for each of the zones 360a-360n. Next, the method 600 may move to the decision step 612.

In the decision step 612, the processor 102 may determine whether the level of IR light is above the overexposure threshold for any of the zones 360a-360n. If the level of IR light is above the overexposure threshold, then the method 600 may move to the step 614. In the step 614, the processor 102 may decrease the amount of IR light generated by the addressable emitter segments 250a-250n that are associated with the zones 360a-360n that are above the overexposure threshold. In an example, the signal ZONES may comprise instructions for the addressable segments 250a-250n that have been determined to cause overexposure to reduce an amount of IR light generated. Next, the method 600 may move to the decision step 616. In the decision step 612, if the level of IR light is not above the overexposure threshold for any of the zones 360a-360n, then the method 600 may move to the decision step 616.

In the decision step 616, the processor 102 may determine whether the level of IR light is below the underexposure threshold for any of the zones 360a-360n. If the level of IR light is below the underexposure threshold, then the method 600 may move to the step 618. In the step 618, the processor 102 may increase the amount of IR light generated by the addressable emitter segments 250a-250n that are associated with the zones 360a-360n that are below the underexposure threshold. In an example, the signal ZONES may comprise instructions for the addressable segments 250a-250n that have been determined to cause underexposure to increase an amount of IR light generated. Next, the method 600 may move to the step 620. In the decision step 616, if the level of IR light is not below the underexposure threshold for any of the addressable segments 250a-250n, then the method 600 may move to the step 620. The step 620 may end the method 600.

Figure 12:
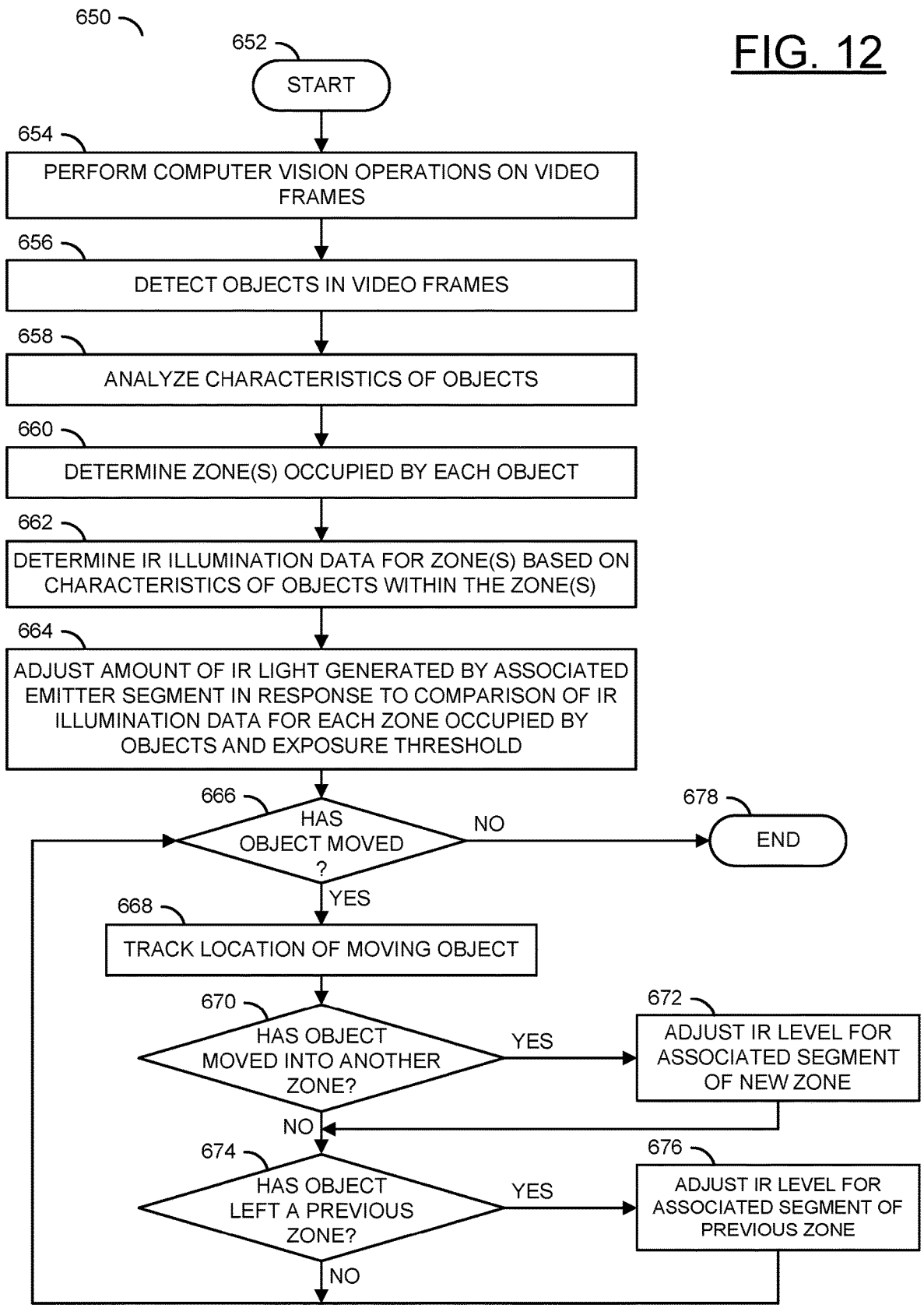
FIG. 12 is a flow diagram illustrating a method for adjusting IR illumination in response to tracking a movement of a detected object.

Referring to FIG. 12, a method (or process) 650 is shown. The method 650 may adjust IR illumination in response to tracking a movement of a detected object. The method 650 generally comprises a step (or state) 652, a step (or state) 654, a step (or state) 656, a step (or state) 658, a step (or state) 660, a step (or state) 662, a step (or state) 664, a decision step (or state) 666, a step (or state) 668, a decision step (or state) 670, a step (or state) 672, a decision step (or state) 674, a step (or state) 676, and a step (or state) 678.

The step 652 may start the method 650. In the step 652, the processor 102 may perform computer vision operation on the video frames. In an example, the ANN module 190b may perform the computer vision operations. Next, in the step 654, the ANN module 190b may detect the objects in the video frame 420. In an example, objects of interest (e.g., the person 430) may be distinguished from the background objects 422a-422n. In the step 656, the ANN module 190b may analyze the characteristics of the objects detected. Next, the method 650 may move to the step 660.

In the step 660, the processor 102 may determine the one or more zones 360a-360n that each of the objects detected may occupy. In an example, the processor 102 may determine a position of each of the objects in the video frame 400 and compare the position to the locations defined for each of the zones 360a-360n. Next, in the step 662, the processor 102 may determine the IR illumination data for each of the zones 360a-360n based on the characteristics of the objects detected in each of the zones 360a-360n. In an example, the characteristics of the objects detected may comprise an amount of illumination, a size of the object, a distance of the object from the lens 160, an amount of IR light projected onto the object, etc. In the step 664, the processor 102 may adjust the amount of IR light generated by the addressable emitter segments 250a-250n associated with the zones 360a-360n occupied by the object detected in response to a comparison of the IR illumination data for each of the zones 360a-360n and the exposure threshold. Next, the method 650 may move to the decision step 666.

In the decision step 666, the processor 102 may determine whether the object detected has moved. In an example, the ANN module 190b may determine the location(s) of objects detected over a sequence of video frames in order to determine any changes in locations of the objects detected. If the object detected has moved, then the method 650 may move to the step 668. In the step 668, the processor 102 may track the movement of objects from video frame to video frame over time. Next, the method 650 may move to the decision step 670.

In the decision step 670, the processor 102 may determine whether the object has moved into another of the zones. In an example, the processor 102 may compare the location of the moving objects to the locations of each of the zones 360a-360n (e.g., thresholds for the zones 360a-360n may be illustrated as the dashed vertical lines 352a-352b and the dashed horizontal lines 354a-354b in FIGS. 8-9). An object may have moved into another zone by crossing the threshold for each of the zones 360a-360n. If an object has moved into another of the zones 360a-360n, then the method 650 may move to the step 672. In the step 672, the processor 102 may generate the signal ZONES to adjust the IR light level for the one of the addressable segments 250a-250n that may be associated with the new one of the zones 360a-360n that the object has moved into. Next, the method 650 may move to the decision step 674. In the decision step 670, if the object has not moved into another one of the zones 360a-360n, then the method 650 may move to the decision step 674.

In the decision step 674, the processor 102 may determine whether the object has left a previously occupied zone. In an example, an object may have left a previously occupied zone when all of the object crosses the threshold out of one of the zones 360a-360n. If the object has left a previously occupied zone, then the method 650 may move to the step 676. In the step 676, the processor 102 may generate the signal ZONES to adjust the IR light level for the one of the addressable segments 250a-250n that may be associated with the previous one of the zones 360a-360n that was occupied by the object. In an example, if the is zone no longer occupied by an object, the amount of IR light may be reduced (or turned off) to save power. Next, the method 650 may return to the decision step 666. In the decision step 674, if the object has not left a previously occupied zone, then the method 650 may return to the decision step 666.

In the decision step 666, if the object has not moved, then the method 650 may move to the step 678. The step 678 may end the method 650.

Figure 13:
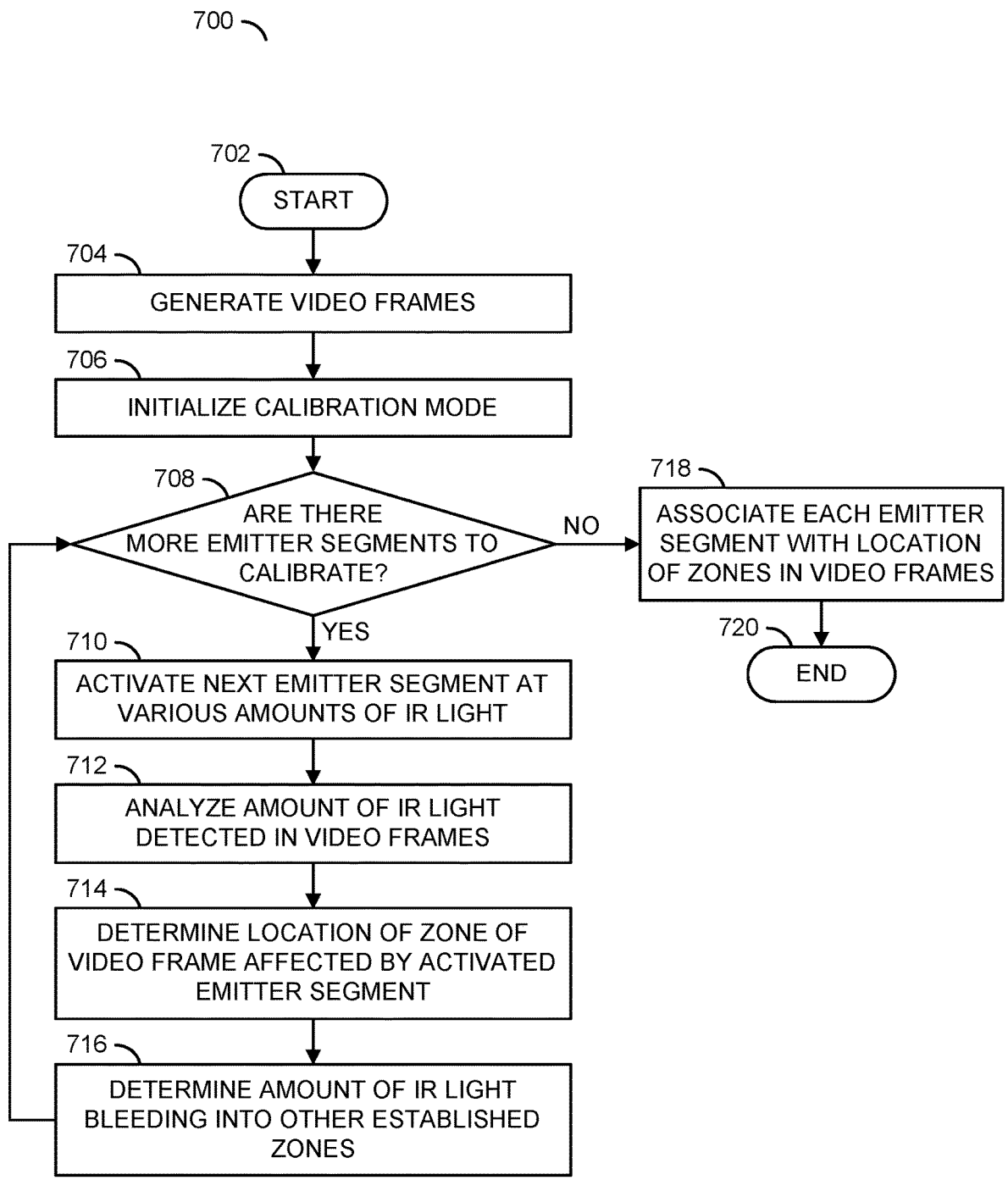
FIG. 13 is a flow diagram illustrating a method for calibrating an association of zones in video frames with IR light emitted by an independently adjustable multi-region array.

Referring to FIG. 13, a method (or process) 700 is shown. The method 700 may calibrate an association of zones in video frames with IR light emitted by an independently adjustable multi-region array. The method 700 generally comprises a step (or state) 702, a step (or state) 704, a step (or state) 706, a decision step (or state) 708, a step (or state) 710, a step (or state) 712, a step (or state) 714, a step (or state) 716, a step (or state) 718, and a step (or state) 720.

The step 702 may start the method 700. In the step 704, the processor 102 may generate the video frames. Next, in the step 706, the processor 102 may initialize a calibration mode of operation. In some embodiments, the calibration mode of operation may be manually initiated in response to a user input. In some embodiments, the calibration mode of operation may be performed at particular intervals of time (e.g., daily, weekly, monthly, etc.). Next, the method 700 may move to the decision step 708.

In the decision step 708, the processor 102 may determine whether there are more of the addressable emitter segments 250a-250n to calibrate. Generally, each of the addressable emitter segments 250a-250n may be calibrated sequentially in order to determine the amount, strength and/or location of the IR light generated individually by each of the addressable emitter segments 250a-250n. If there are more of the addressable emitter segments 250a-250n to calibrate, then the method 700 may move to the step 710. In the step 710, each of the addressable emitter segments 250a-250n may be turned off and the processor 102 may generate the signal ZONES to activate a next one of the addressable emitter segments 250a-250n at various amounts of IR light. Next, the method 700 may move to the step 712.

In the step 712, the processor 102 may analyze the amount of IR light detected in the video frame while the single one of the addressable emitter segments 250a-250n is active. Next, in the step 714, the processor 102 may determine a location of one of the zones 360a-360n of the video frame that is affected by the single one of the activated addressable emitter segments 250a-250n. For example, with only one of the addressable emitter segments 250a-250n activated, the processor 102 may isolate the location(s) and/or determine the boundaries for a particular one of the zones 360a-360n that is affected by a particular one of the addressable emitter segments 250a-250n. Next, in the step 716, the processor 102 may determine an amount of IR light that may bleed into another of the zones 360a-360n. In an example, the IR light emitted by one of the addressable segments 250a-250n may primarily affect one of the zones 360a-360n, but may partially extend (e.g., a lesser amount) into another one of the zones 360a-360n that has been previously established. In some embodiments, the processor 102 may adjust the boundaries that define the zones 360a-360n in response to IR light bleeding into another one of the zones 360a-360n and/or determine that two of the addressable segments 250a-250n should be adjusted (e.g., by different amounts based on the amount of IR light that bleeds into another of the zones 360a-360n) when adjusting the amount of IR light in one of the zones 360a-360n (e.g., when in a normal mode of operation). In some embodiments, the locations and/or directions that the addressable segments 250a-250n emit the IR light may drift over time (e.g., as components age, due to physical contact, etc.) and the processor 102 may re-adjust the location of the zones 360a-360n. Next, the method 700 may return to the decision step 708.

In the decision step 708, if the processor 102 determines that each of the addressable emitter segments 250a-250n have been activated individually for calibration, then the method 700 may move to the step 718. In some embodiments, the processor 102 may perform more iterations of calibration by activating combinations of the addressable segments 250a-250n (e.g., adjacent segments). In the step 718, the processor 102 may associate each of the addressable emitter segments 250a-250n with a location of the zones 360a-360n in the video frames. The locations for the association may be determined based on the locations of the IR light determined for each of the addressable emitter segments 250a-250n during the calibration. Next, the method 700 may move to the step 720. The step 720 may end the method 700.

The functions performed by the diagrams of FIGS. 1-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   an infrared (IR) illuminator comprising an array of emitters divided into a plurality of segments each configured to generate an amount of an IR light;
   an interface configured to receive pixel data comprising said IR light from an RGB-IR sensor; and
   a processor configured to (i) process said pixel data arranged as video frames, (ii) measure a level of IR reflection for each of a plurality of zones of said video frames, (iii) associate said plurality of zones of said video frames with said IR light generated by each of said plurality of segments of said IR illuminator in response to a calibration process, (iv) perform a comparison of said level of IR reflection in each of said zones to an exposure threshold, and (v) generate a control signal in response to said comparison, wherein
   (a) a shape of each of said zones in said video frames corresponds to a subsection of said video frames that is associated with a shape of said array of emitters of a respective one of said segments,
   (b) said control signal is configured to independently adjust said amount of said IR light generated by each of said segments of said array of emitters for each of said plurality of zones,
   (c) said amount of said IR light is adjusted from a current amount in each of said zones in response to said comparison determining that said level of IR reflection is outside of said exposure threshold, and
   (d) said calibration process comprises (I) sequentially activating said plurality of segments, (II) analyzing said level of IR reflection detected in said video frames for each individual one of said segments, (III) determining boundaries for one of said zones affected by one of said segments, (IV) detecting an amount of light bleed outside said boundaries for one of said zones from said level of IR reflection and (V) adjusting said boundaries for said zones in response to said amount of light bleed outside said boundaries.

2. The apparatus according to claim 1, wherein said IR illuminator comprises a Vertical Cavity Surface Emitting Laser (VCSEL).

3. The apparatus according to claim 2, wherein (i) said VCSEL is implemented with a thin die thickness and (ii) said thin die thickness enables said apparatus to be implemented in a housing comprising a thin profile.

4. The apparatus according to claim 3, wherein said VCSEL is implemented using a circuit having said thin die thickness of approximately 0.1 µm.

5. The apparatus according to claim 2, wherein (i) said plurality of segments of said VCSEL each comprise an I/O port and a portion of said array of emitters, (ii) said I/O port for each of said segments is located on an outer edge of said IR illuminator and (iii) each of said I/O ports enable said portion of said array of emitters of said plurality of segments to be independently addressable by said control signal.

6. The apparatus according to claim 2, wherein (i) each of said plurality of segments comprises a plurality of IR laser emitters and (ii) a strength of said IR light generated by said plurality of IR laser emitters is adjustable in response to said control signal.

7. The apparatus according to claim 1, wherein said IR illuminator comprises said array of emitters implemented in a 3×3 arrangement of said plurality of segments.

8. The apparatus according to claim 1, wherein said level of IR reflection (i) corresponds to an intensity of said IR light captured in said pixel data by said RGB-IR sensor and (ii) said level of IR reflection is extracted in response to analyzing IR pixels of said RGB-IR sensor.

9. The apparatus according to claim 8, wherein (i) said amount of said IR light generated by each of said segments of said array of emitters is increased in response to detecting that said intensity of said IR light captured is below said exposure threshold for underexposure and (ii) said amount of said IR light generated by each of said segments of said array of emitters is decreased in response to detecting that said intensity of said IR light captured is above said exposure threshold for overexposure.

10. The apparatus according to claim 1, wherein said level of IR reflection (i) corresponds to an intensity of said IR light captured in said pixel data by said RGB-IR sensor and (ii) is extracted in response to performing computer vision operations on said video frames.

11. The apparatus according to claim 1, wherein (a) said processor is further configured to (i) perform computer vision operations on said video frames to detect objects in said video frames, (ii) analyze characteristics of said objects detected, and (iii) said level of IR reflection is determined in response to said characteristics of said objects detected and (b) said control signal is generated in response to said comparison and said characteristics of said objects detected for each of said segments.

12. The apparatus according to claim 11, wherein said processor is further configured to (i) detect a person in response to analyzing said characteristics of said objects detected, (ii) determine said zones that are occupied by said person and (iii) generate said control signal in response to said zones that are occupied by said person.

13. The apparatus according to claim 12, wherein said control signal is configured to reduce said amount of said IR light generated in said zones that are occupied by said person in response to a distance of said person from said apparatus.

14. The apparatus according to claim 12, wherein said processor is further configured to (i) track a location of said person over time and (ii) change a selection of said zones that are occupied by said person as said location of said person changes over said time.

15. The apparatus according to claim 11, wherein said processor is further configured to (i) detect a stationary object in response to analyzing said characteristics of said objects detected, (ii) determine said zones that are occupied by said stationary object and (iii) generate said control signal in response to said zones that are occupied by said stationary object.

16. The apparatus according to claim 11, wherein (i) said characteristics comprise a distance of said objects to a lens of said apparatus and (ii) said IR light is adjusted to (a) reduce said amount of said IR light generated in said zones that are occupied by said objects having said distance that is closer than a first threshold distance for overexposure and (b) increase said amount of said IR light generated in said zones that are occupied by said objects having said distance that is greater than a second threshold distance for underexposure.

17. The apparatus according to claim 1, wherein (i) said IR illuminator comprises IR light emitting diodes (LEDs) and (ii) said array of emitters comprises independently addressable groups of said IR LEDS.

18. The apparatus according to claim 1, wherein (i) said video frames are captured during a first time with daylight, (ii) said processor is further configured to (a) perform computer vision operations on said video frames illuminated by said daylight, (b) determine characteristics corresponding to each of said zones during said daylight, and (c) independently adjust said amount of said IR light generated by each of said segments for each of said plurality of zones during a second time without said daylight in response to said characteristics determined during said daylight, and (iii) said characteristics comprise (a) a location of a static object and (b) a location that has a likelihood of comprising an object of interest.

19. An apparatus comprising:

an infrared (IR) illuminator comprising an array of emitters divided into a plurality of segments each configured to generate an amount of an IR light;

an interface configured to receive pixel data comprising said IR light from an RGB-IR sensor; and a processor configured to (i) process said pixel data arranged as video frames, (ii) measure a level of IR reflection for each of a plurality of zones of said video frames, (iii) perform a comparison of said level of IR reflection in each of said zones to an exposure threshold, (iv) capture said video frames during a first time with daylight, (v) perform computer vision operations on said video frames illuminated by said daylight, (vi) determine characteristics corresponding to each of said zones during said daylight, (vii) independently adjust said amount of said IR light generated by each of said segments for each of said plurality of zones during a second time without said daylight in response to said characteristics determined during said daylight, and (viii) generate a control signal in response to said comparison, wherein (a) a shape of each of said zones in said video frames corresponds to a subsection of said video frames that is associated with a shape of said array of emitters of a respective 22 one of said segments, (b) said control signal is configured to independently adjust said amount of said IR light generated by each of said segments of said array of emitters for each of said plurality of zones, (c) said amount of said IR light is adjusted from a current amount in each of said zones in response to said comparison determining that said level of IR reflection is outside of said exposure threshold, and (d) said characteristics comprise (I) a location of a static object and (II) a location that has a likelihood of comprising an object of interest.

* * * * *